(12) United States Patent
Pleus

(10) Patent No.: US 11,934,225 B1
(45) Date of Patent: Mar. 19, 2024

(54) MOBILE DEVICE SUPPORT SYSTEM

(71) Applicant: Albert Mitchell Pleus, Honolulu, HI (US)

(72) Inventor: Albert Mitchell Pleus, Honolulu, HI (US)

( * ) Notice: Subject to any disclaimer, the term of this patent is extended or adjusted under 35 U.S.C. 154(b) by 0 days.

(21) Appl. No.: 16/986,144

(22) Filed: Aug. 5, 2020

Related U.S. Application Data

(60) Provisional application No. 62/882,616, filed on Aug. 5, 2019.

(51) Int. Cl.
G06F 1/16 (2006.01)
H04B 1/3877 (2015.01)

(52) U.S. Cl.
CPC ......... G06F 1/1632 (2013.01); H04B 1/3877 (2013.01)

(58) Field of Classification Search
CPC ............................ G06F 1/1632; H04B 1/3877
See application file for complete search history.

(56) References Cited

U.S. PATENT DOCUMENTS

| | | | |
|---|---|---|---|
| 6,256,193 B1 * | 7/2001 | Janik | G06F 1/1669 248/922 |
| 6,480,376 B1 * | 11/2002 | Nguyen | G06F 1/1632 361/755 |
| 6,583,985 B2 * | 6/2003 | Nguyen | G06F 1/1632 361/679.43 |
| 6,913,238 B2 * | 7/2005 | Bakker | F16M 13/00 361/679.55 |
| 7,035,100 B2 * | 4/2006 | Lord | G06F 1/1632 361/679.41 |
| 7,364,129 B1 * | 4/2008 | Levari, Jr. | A47G 23/0216 108/4 |
| 7,487,940 B2 * | 2/2009 | Saez | F16M 11/041 248/176.1 |
| 7,775,356 B2 * | 8/2010 | Palmer | A45C 5/03 206/45.24 |
| 7,911,784 B2 * | 3/2011 | Jones | G06F 1/1632 361/679.55 |
| 8,634,188 B2 * | 1/2014 | Haren | G06F 1/1632 361/679.44 |
| 10,564,670 B2 * | 2/2020 | Mos | F16M 11/00 |
| 2002/0159231 A1 * | 10/2002 | Nguyen | G06F 1/1632 361/679.43 |
| 2003/0111582 A1 * | 6/2003 | Bakker | G06F 1/1632 248/460 |
| 2004/0233631 A1 * | 11/2004 | Lord | G06F 1/1632 361/679.41 |
| 2005/0274852 A1 * | 12/2005 | Saez | F16M 13/00 248/121 |

(Continued)

Primary Examiner — Anthony M Haughton
Assistant Examiner — Theron S Milliser

(57) ABSTRACT

A system for supporting a mobile device is described. The system includes a base and a top collapsibly coupled to the base. The top is configured to retain the mobile device and to lock at an angle with respect to the base. The angle has a vertex and is at least forty-five degrees and not more than one hundred degrees. The top and the base are configured such that a center of mass of a combination of the mobile device and the system is a nonzero distance along the base from the vertex of the angle and such that the combination is stable with respect to rotations around an axis including the vertex for the base being supported and oriented perpendicular to a direction of local gravity.

18 Claims, 14 Drawing Sheets

(56) References Cited

U.S. PATENT DOCUMENTS

| | | | | |
|---|---|---|---|---|
| 2006/0250767 A1* | 11/2006 | Brophy | ................ | G06F 1/1632 |
| | | | | 361/679.45 |
| 2009/0178938 A1* | 7/2009 | Palmer | .................... | A45C 5/03 |
| | | | | 206/45.24 |
| 2009/0316355 A1* | 12/2009 | Jones | .................... | G06F 1/1632 |
| | | | | 361/679.55 |
| 2011/0069445 A1* | 3/2011 | Haren | ................... | G06F 1/1632 |
| | | | | 361/679.44 |
| 2012/0068043 A1* | 3/2012 | Daigle | ................. | G06F 1/1628 |
| | | | | 248/682 |
| 2017/0302322 A1* | 10/2017 | Harris | ............... | F16M 11/2021 |
| 2019/0121393 A1* | 4/2019 | Mos | ....................... | A45C 9/00 |

* cited by examiner

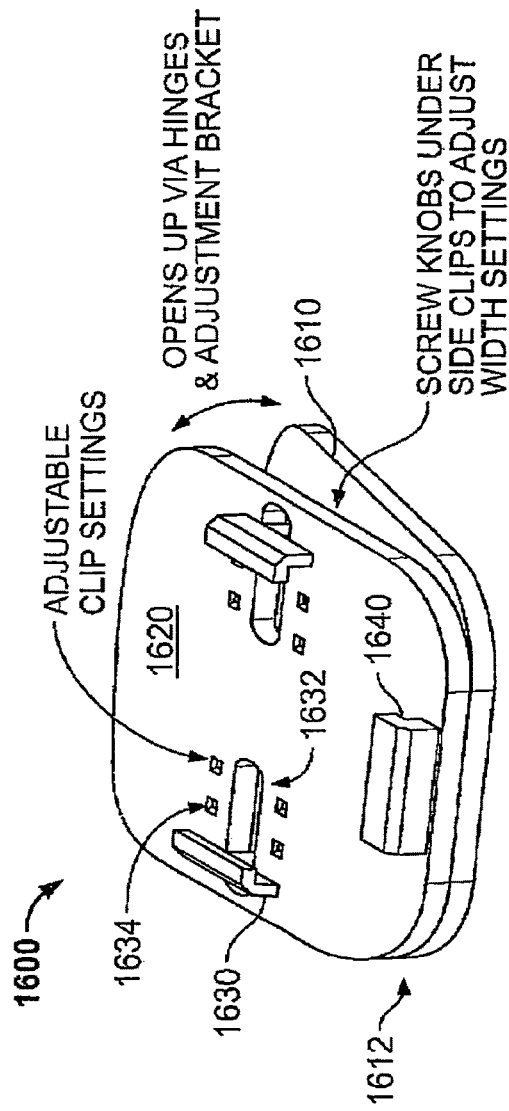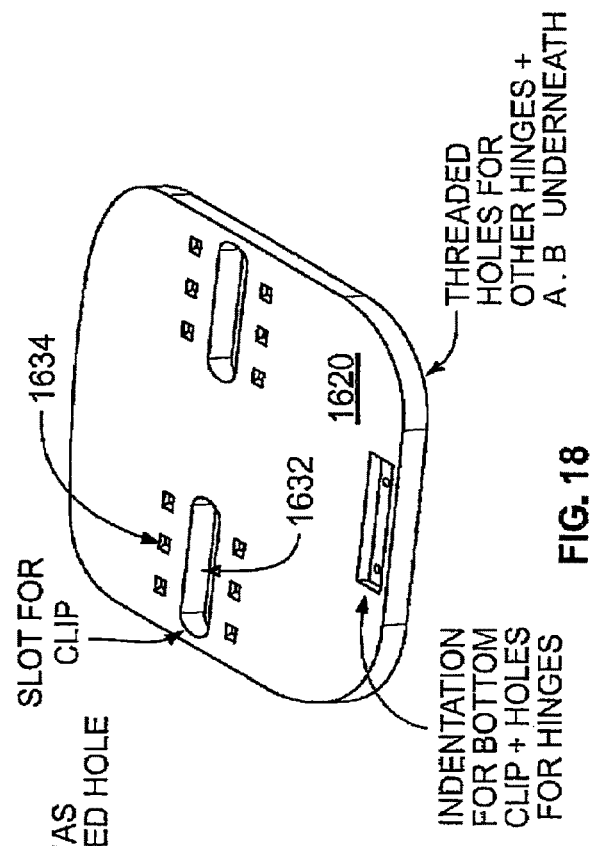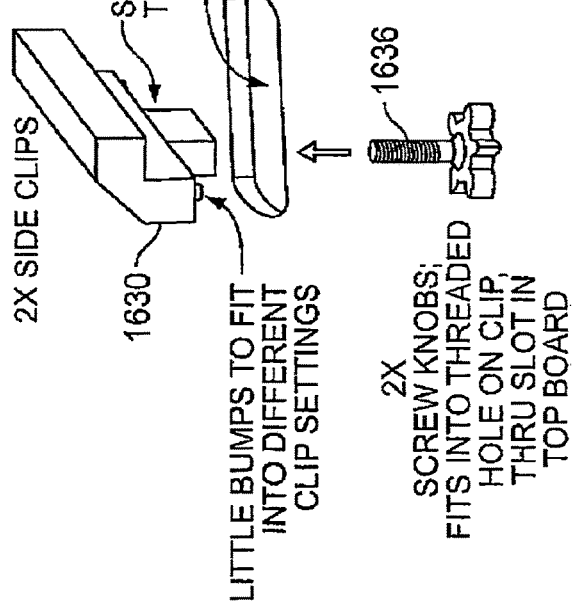

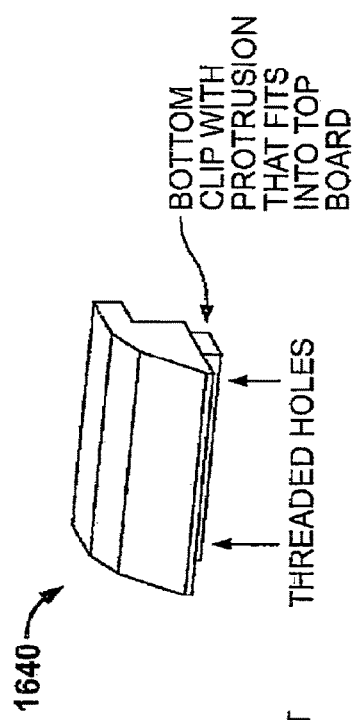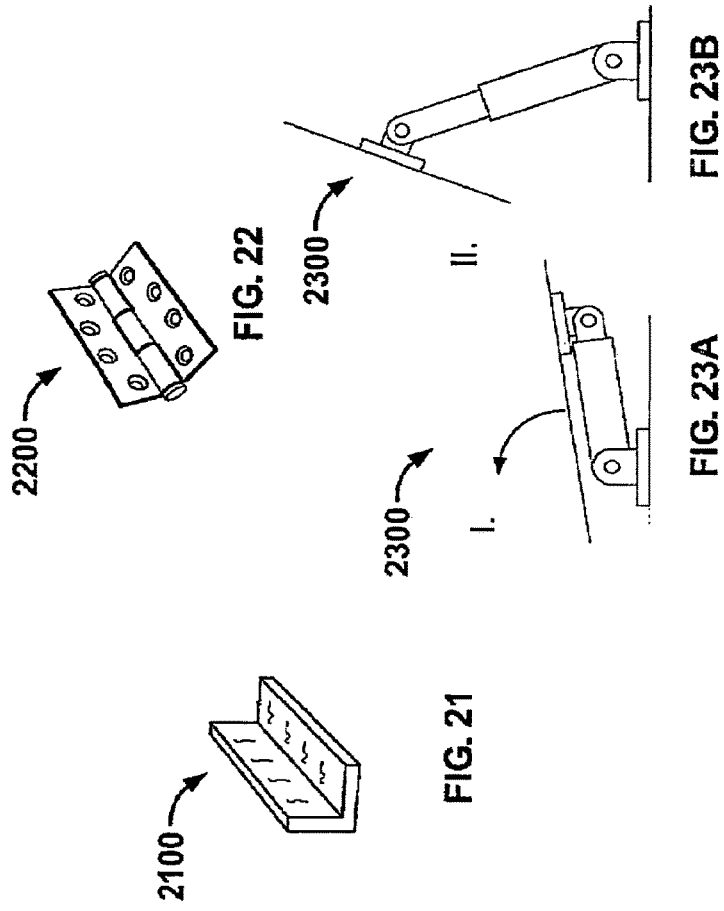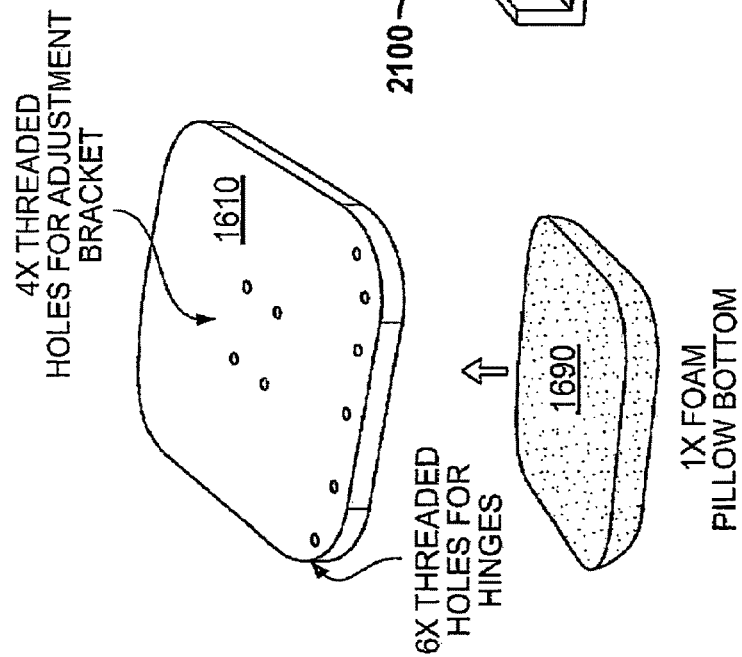

MOBILE DEVICE SUPPORT SYSTEM

CROSS-REFERENCE TO RELATED APPLICATIONS

This application claims the benefit of provisional Patent Application Ser. No. 62/882,616, filed Aug. 5, 2019, entitled "LAZY LAP", assigned to the assignee of the present application, and incorporated herein by reference for all purposes.

BACKGROUND

Mobile devices, such as laptops, notebooks, tablets, smartphones and other such computing devices, are designed to be portable. Larger mobile devices, such as laptops and tablets, are generally configured to be employed while a user is seated. Thus, the laptop typically rests on a table or on the user's lap. Although useful, mobile devices may not be ergonomic in situations in which the user is not seated. For example, the keyboard and display of a laptop may be difficult to use and see, respectively, if the user is lying down. Thus, an improved mechanism for supporting a mobile device is desired.

BRIEF DESCRIPTION OF SEVERAL VIEWS OF THE DRAWINGS

FIG. 16 depicts an embodiment of a system for supporting a mobile device.

FIGS. 17-18 depict embodiments of portions of a system for supporting a mobile device.

FIGS. 19-22 and 23A-23B depict portions of embodiments of systems for supporting a mobile device.

DETAILED DESCRIPTION OF THE INVENTION

Figure 1A:
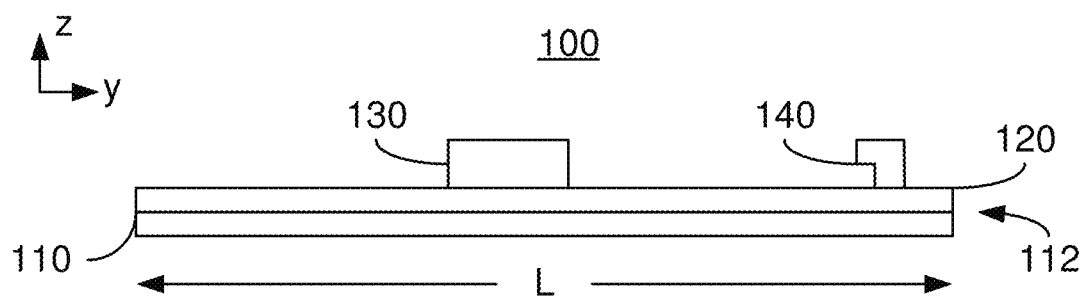
FIGS. 1A-1H depict an embodiment of a system for supporting a mobile device in various configurations.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations.

Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or fewer components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein. For example, specific sizes of components, configuration of components, type of components and number of components may change depending on different implementations. The material(s) used for various components may also be changed in various embodiments.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

A system for supporting a mobile device is described. The system includes a base and a top collapsibly coupled to the base. The top is configured to retain the mobile device and to lock at an angle with respect to the base. The angle has a vertex and is at least forty-five degrees and not more than one hundred degrees. In some embodiments, the angle is at least sixty degrees. In some embodiments, the angle is at least seventy degrees. In some embodiments, the angle is at least eighty degrees. In some embodiments, the angle is nominally ninety degrees. The top and the base are configured such that a center of mass of a combination of the mobile device and the system is a nonzero distance along the base from the vertex of the angle and such that the combination is stable with respect to rotations around an axis including the vertex for the base being supported and oriented perpendicular to a direction of local gravity. In some embodiments, the nonzero distance is at least ten percent of the length of the base. In some embodiments, the nonzero distance is at least fifteen percent of the length of the base. The base and top may be formed of material(s) having a constant density or a varying density. For example, the density of a first portion of the base further from the vertex than the nonzero distance may have a higher density than a second portion of the base closer to the vertex than the nonzero distance. In some embodiments, the top is coupled to the base in a clamshell configuration. In some embodiments, the base has an edge and the axis is located a distance from the edge.

The system may also include at least one support structure. The support structure(s) are coupled to the top and the base. Further, the support structure(s) have a plurality of locking positions such that the top is locked at the angle with respect to the base. In some embodiments, the top includes a plurality of adjustable retaining mechanisms for stabilizing the mobile device against rotations around an additional axis perpendicular to the axis.

In some embodiments, the top and the base are configured such that the combination is stable with respect to rotations around the axis for the base being supported and at an acute angle to the direction of local gravity, the acute angle being at least sixty degrees.

In some embodiments, the mobile device supported by the system has a display and a bottom portion, or base, having an edge. The display is connected to the bottom portion along the edge. The system is configured such that the combination is stable with respect to the rotations around the axis for the display having a maximum torque around the axis. In some embodiments, the display has the maximum torque when oriented perpendicular to the direction of local gravity.

In some embodiments, the system includes a base, a top assembly and support structure(s). The top assembly includes a panel and at least one retaining mechanism. The panel is collapsibly coupled to the base in a clamshell configuration. The top assembly is configured to retain the mobile device and being configured such that the panel is lockable at a first angle with respect to the base. The first angle has a vertex and is at least eighty degrees and not more than one hundred degrees. The top assembly and the base are configured such that a center of mass of a combination of the mobile device and the system is a nonzero distance along the base from the vertex of the first angle and such that the combination is stable with respect to rotations around a first axis including the vertex for the base being supported and oriented at a second angle to a direction of local gravity. The second angle is at least sixty degrees (e.g. thirty degrees from horizontal). The retaining mechanism(s) are configured to hold at least a portion of the mobile device in contact with the panel and such that the mobile device is stable with respect to rotations around a second axis perpendicular to the first axis. The support structure(s) are coupled to the base and the top assembly. The support structure(s) have multiple locking positions to lock the panel at the first angle with respect to the base. The system may be configured such that the combination is stable with respect to the rotations around the axis for the display having a maximum torque around the axis. In some embodiments, the display has the maximum torque when oriented perpendicular to the direction of local gravity.

A method for providing a system configured to support a mobile device is described. The method includes providing the base and top described herein. For example, in some embodiments, the method includes coupling the top to the base in a clamshell configuration. The method may also include providing the support structure(s). The support structure(s) are coupled to the base and the top assembly. The support structure(s) have multiple locking positions to lock the panel at the first angle with respect to the base. Providing the top may also include providing adjustable retaining mechanisms for stabilizing the mobile device against rotations around an additional axis perpendicular to the axis. The method may also include configuring the system such that the combination is stable with respect to the rotations around the axis for the display having a maximum torque around the axis. In some embodiments, the display has the maximum torque when oriented perpendicular to the direction of local gravity. Thus, the system may be configured in analogous manner to that described above.

In some embodiments, an apparatus for supporting a laptop computer is described. In some embodiments, the apparatus supports a laptop computer and/or other mobile device such that the base of the laptop is stably held at multiple nonzero acute angles with respect to the horizontal. In some embodiments, the maximum angle at which the laptop is held is an angle less than or equal to ninety degrees such that the center of mass of the laptop and/or the center of mass of the combination of the apparatus and laptop supported by the apparatus is at or behind edges (e.g. the pivot of the hinge) where the two panels of the folding apparatus (top and bottom panels) meet. In some embodiments, the laptop may be open with any angle between laptop base and laptop screen and have this condition held. In some embodiments, as long as the bottom panel is at or sufficiently close to (e.g. within 10 degrees, 20 degrees, or 30 degrees in various embodiments) horizontal, the laptop is stably held and does not rotate forward around the hinge/edges (with or without a remaining portion of the apparatus moving), regardless of the position of the laptop screen with respect to the laptop base.

In some embodiments, the apparatus also includes laptop retaining mechanisms (e.g. clips, bands and/or other mechanism(s)) that may be positioned at the sides of the laptop with some overhang over the laptop base. The horizontal distance between these laptop retaining mechanisms may be adjusted to fit laptops of different widths, and they may be fixed to the panel in different positions to allow access to different ports on the laptop. The laptop retaining mechanisms may prevent the laptop from moving sideways a sufficient distance to be inadvertently released from the apparatus. In other embodiments, other retaining mechanisms having analogous functions may be used.

The system also contains perpendicular retaining mechanisms (e.g. stops and/or the clips in the embodiments shown) that may be positioned close to the hinge where the two panels meet to keep the laptop from slipping off of the top panel when the laptop is held by the apparatus at a nonzero angle with respect to the bottom panel (or horizontal).

These retaining mechanisms may or may not also fold into the apparatus, be removed or otherwise configured so as to protrude minimally from the top plane of the top panel or bottom plane of the bottom panel.

The combination of retaining mechanisms, the top and bottom panels, in some embodiments support structures, and gravity prevent movement and/or rotation of the laptop a sufficient amount in any direction to fall off of the panel. In some embodiments, the combinations of retaining mechanisms, top and bottom panels, in some embodiments support structures, and gravity substantially prevent movement of the laptop in any direction with respect to the panel, and prevent rotation in any direction with respect to the panel if the bottom panel is close to flush with the horizontal (e.g. within 10 degrees, 20 degrees or 30 degrees of horizontal in various embodiments).

In some embodiments, the system may also collapse to fold flat (defined as the state when the angle between the top and bottom is zero). In some embodiments, the system collapses to fold to a small angle (e.g. greater than zero and less than ten degrees, twenty degrees or thirty degrees).

Figure 1B:
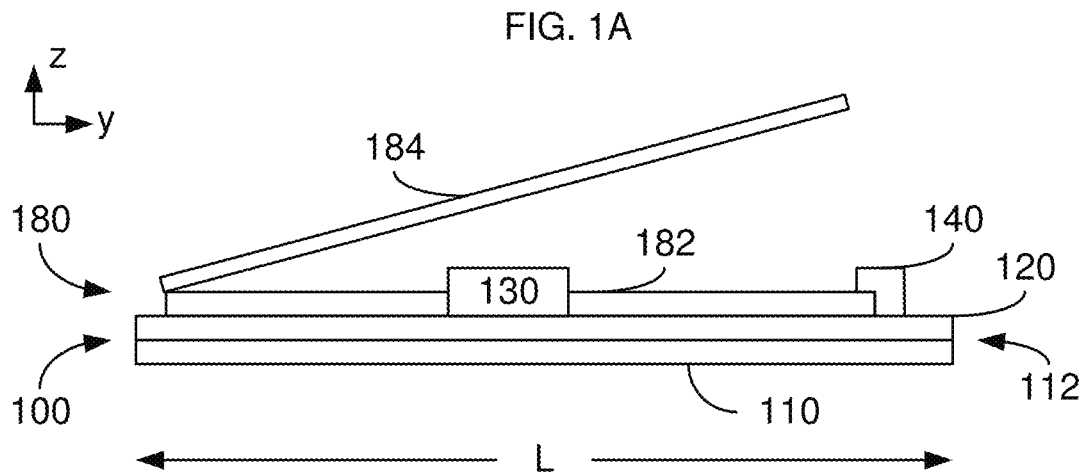
Figure 1C:
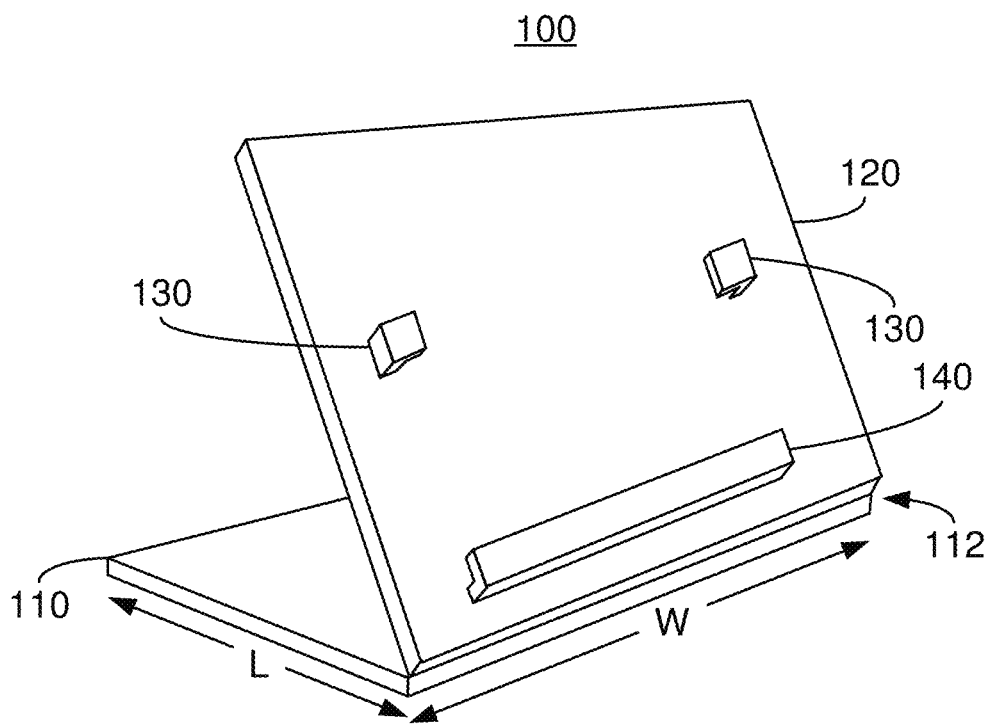
Figure 1D:
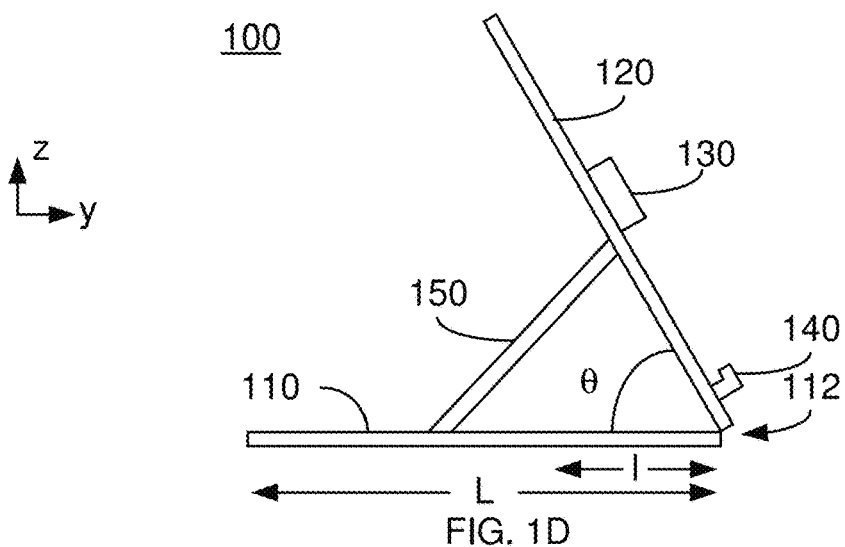
Figure 1E:
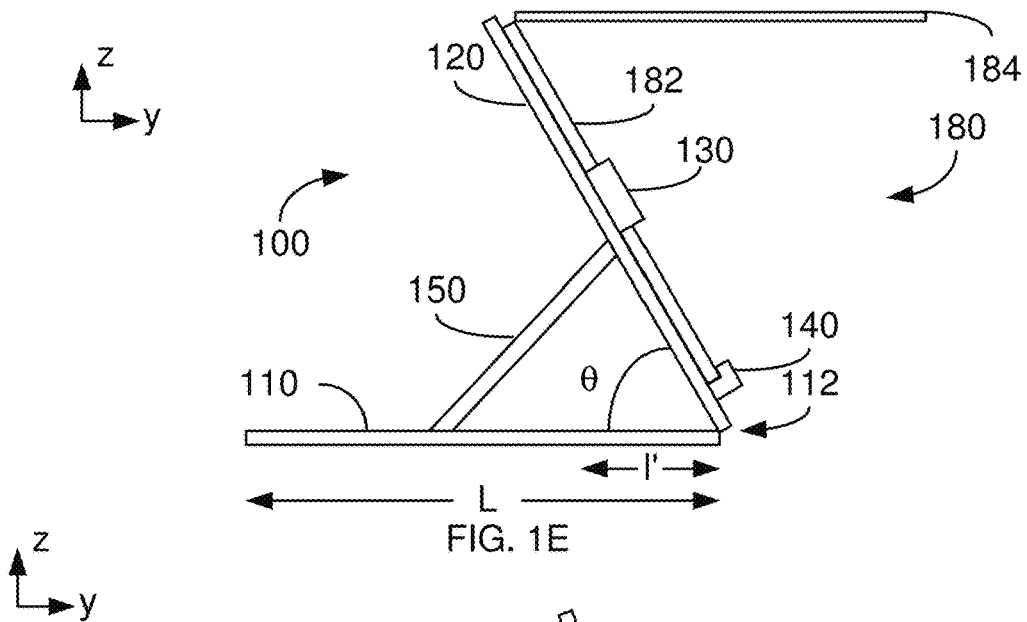
Figure 1F:
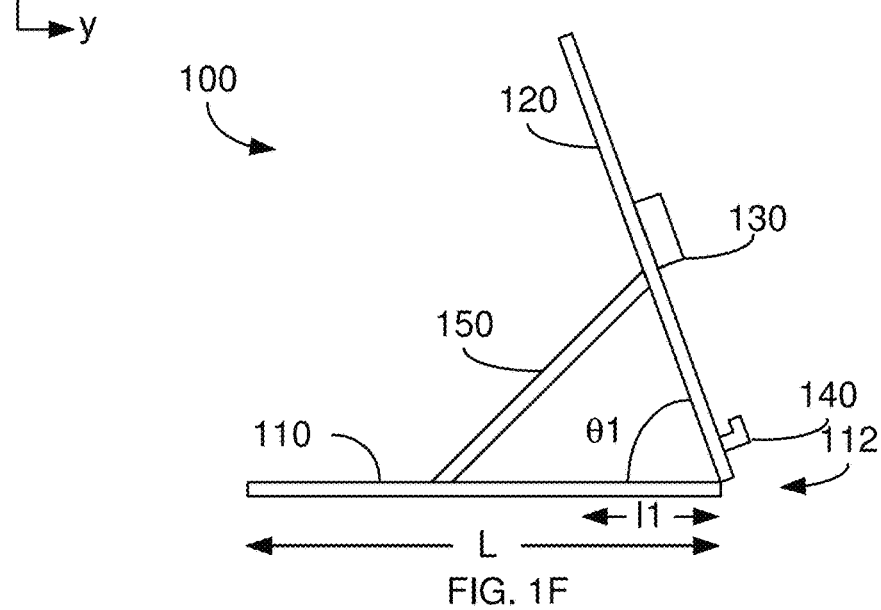
Figure 1G:
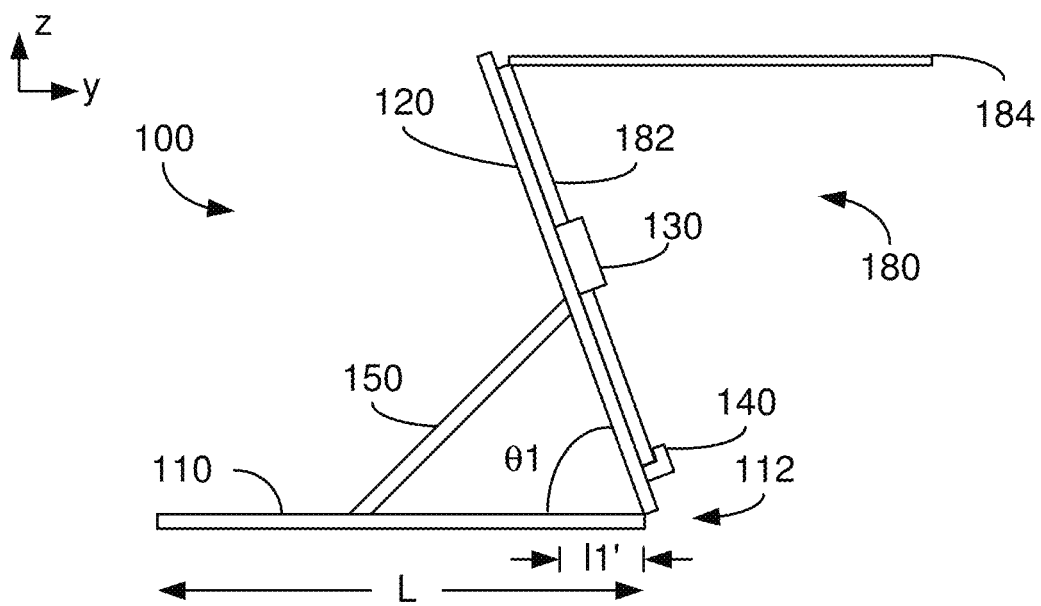
Figure 1H:
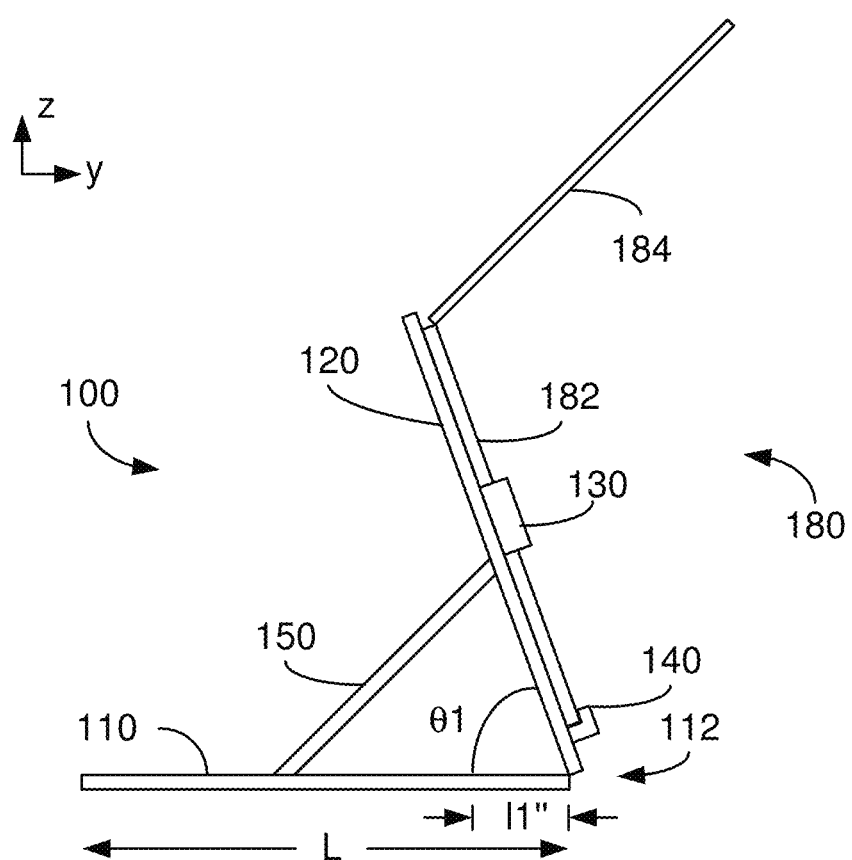

FIGS. 1A-1H depict an embodiment of system 100 for supporting a mobile device in various configurations. FIG. 1A depicts system 100 as collapsed. FIG. 1B depicts the collapsed system 100 used in conjunction with mobile device 180. In the embodiment shown in FIGS. 1A-1H, mobile device 180 is a laptop. Mobile device 180 thus includes a base 182 and a display 184 configured to meet at one edge and open from the opposite edge (i.e. a clamshell configuration). In other embodiments, other mobile devices may be used in conjunction with other mobile devices, including but not limited to a notebook, a tablet, or other analogous device. FIG. 1C depicts system 100 at angle. FIGS. 1D-1E are side views depicting system 100 supported at an angle without and with mobile device 180. FIGS. 1F-1H are side views depicting system 100 supported at another angle without and with mobile device 180 in various configurations.

Referring to FIGS. 1A-1B, system 100 includes at least base 110 and top 120 that is coupled to base 110. For system 100, top 120 is coupled to base 110 at or near hinge region/axis 112 and opens from the edge opposite to hinge region 112. Thus, system 100 has a clamshell configuration. In other embodiments, top 120 may be coupled to base 110 in another manner.

In the embodiment shown, top 120 and base 110 are collapsible such that there is a zero degree angle between base 110 and top 120 when collapsed. In some embodiments, base 110 and top 120 interlock such that some portion of top 120 fits within a portion of base 110, and/or vice versa. In some embodiments, a small angle remains between top 120 and base 110 when system 100 is completely collapsed. When collapsed, the angle between base 110 and top 120 is not more than thirty degrees in some embodiments. This angle is not more than twenty degrees in some embodiments. In some embodiments, the angle between base 110 and top 120 is not more than ten degrees when system 100 is collapsed.

System 100 also includes retaining mechanisms 130 and 140 configured to hold mobile device 180 stably in place. Retaining mechanisms 130 and/or 140 may be considered part of top 120 (e.g. part of a top assembly) in some embodiments, For example, support structures 130 and 140 prevent significant rotations of mobile device 180 away from top 120 (e.g. preventing rotations around axis 112, an axis perpendicular to axis 112). For example, retaining mechanisms 130 and 140 may hold mobile device 180 such that at least a portion of the bottom of base 182 is flush with and, in some embodiments, in contact with top 120. In some embodiments, retaining mechanisms 130 and 140 may be rigid structures configured to fit mobile device 180. For example, in FIG. 1B, bottom retaining mechanism 140 is shown as tightly fitting based the edge of base 182 of mobile device 180. In other embodiments, retaining mechanisms may more loosely fit mobile device 180. For example, in another embodiment (or with another mobile device) there may be space between base 182 of mobile device 180 and retaining mechanism 140. In some embodiments, one or both retaining mechanisms 130 and 140 may be adjustable. For example, retaining mechanisms 130 and/or 140 may be adjustable clips, elastic band(s), strap(s) or other device used to hold mobile device 180 such that mobile device 180 is stable with respect to and supported by top 120. In some embodiments, the position(s) of retaining mechanisms 130 and/or 140 may also be adjusted. For example, retaining mechanism 130 may be moved closer to or further from (e.g. along the y-axis) retaining mechanism 140. In some embodiments, retaining mechanisms 130 and/or 140 are integrally formed as part of top 120. For example, top 120 and retaining mechanisms 120 and/or 130 may be molded as a single piece. In some embodiments, top 120 and base110 are laser cut from a single sheet, such as a sheet of wood. In some embodiments, retaining mechanism(s) 130 and/or 140 may be separable from and/or assembled with top 120. For example, retaining mechanism(s) 130 and/or 140 may be coupled with top 120 at manufacture or by an end user. Top 120 and retaining mechanisms 130 and 140 may be considered part of a top assembly.

FIG. 1C depicts a perspective view of an embodiment of system 100 opened at a particular angle. Thus, both length, L, and width, W, of system 100 are indicated. Top 120 is shown as separated from based 110 by a particular angle. However, nothing prevents the use of other angles. In some embodiments, top 120 and base 110 may be locked at multiple angles. This improves flexibility of system 100. Although shown as substantially solid in FIG. 1C, top 120 and/or base 110 may include apertures and/or other cutouts (not indicated in FIG. 1C). Similarly, top 120 and/or base 110 may have a non-rectangular shape or footprint. Top 120 and/or base 110 may be made of multiple pieces, although separations are not indicated in FIG. 1C. For example, to improve stability, portions of top 120 at or near axis 112 may be removed or formed from materials having a lower density. Portions of top 120 and/or bottom far from axis 112 may be formed from materials having a higher density. In some embodiments, portions of top 120 and/or base 110 far from axis 112 may be formed from materials having a lower density. For example, portions of top 120 far from axis 112 may have a lower density (or be removed) to decrease the lever arm of top 120 for rotations around axis 112 due to gravity. This may improve stability of system 100. In addition to or in lieu of this variation in density of top 120, portions of base 110 closer to axis 112 may have a lower density (or be removed) to increase the lever arm of bottom 110 for rotations around axis 112 due to gravity. This configuration may also improve stability of system 100 because base 110 is supported during use, for example by a table or a part of the user's body. Base 110 and top 120 may be formed of material(s) having a constant density or a varying density. For example, the density of a first portion of base 110 further from the axis 112 than the center of mass of system 100 or the combination of system 100 and mobile device 180 may have a higher density than a second portion of the base closer to axis 112 than the center of mass of system 100 or the combination of system 100 and mobile device 180. Similarly, the density of a first portion of top 120 further from the axis 112 than the center of mass of system 100 or the combination of system 100 and mobile device 180 may have a lower density than a second portion of top 120 closer to axis 112 than the center of mass of system 100 or the combination of system 100 and mobile device 180. Other variations in density may be utilized in some embodiments, FIG. 1D is a side view depicting system 100 open at a first angle, θ. Also shown are support structure(s) 150, which are coupled to top 120 and base 110. Further, the support structure(s) 150 have one or more of locking positions such that the top is locked at the angle with respect to the base. In some embodiments, support structure(s) 150 may be telescoping structures with locks at particular lengths of support structure(s) 150. In some embodiments, support structure(s) 150 may be hinged, lockable structures or other mechanism(s) that lock top 120 at the first angle from base 110. Also shown in FIG. 1D is the distance, 1, of the center of mass of system 100 from axis 112. In some embodiments, the center of mass of system 100 is at the centers of the top 120 and/or base 110 when system 100 is collapsed. In other embodiments, the center of mass of system 100 is further from axis 112 than the center (i.e. greater than a distance L/2 from axis 112) when system 100 is collapsed. In still other embodiments, the center of mass of system 100 is closer to axis 112 (i.e. at a distance less than L/2 from axis 112) when system 100 is collapsed. Once opened, the center of mass of system 100 shifts. In the embodiment shown, the center of mass of system 100 shifts to be closer to axis 112 because of the rotation of top 120 around the edge coupled to base 110 at or near axis 112. However, the center of mass is still a nonzero distance from axis 112. Stated differently, the center of mass of system 100 is a nonzero distance from the edges of top/panel 120 and base 110 at axis 112. As a result, torque from local gravity (along the z-axis) does not cause system 100 to rotate around axis 112 if base 110 is supported.

FIG. 1E depicts system 100 open at a first angle, $\theta$, in conjunction with mobile device 180. The first angle is formed between base 110 and top 120 and has a vertex substantially at axis 112 (e.g. at or near the hinge or connection between base 110 and top 120). Also in FIG. 1E, display 184 is oriented substantially perpendicular to the local direction of gravity (i.e. perpendicular to the z-axis). In some embodiments, this configuration has the maximum torque around axis 112 for a rotation due to the effects of gravity on display 182. This is because in this configuration, display 184 extends the furthest past axis 112. Although supported at a steep angle, $\theta$, with respect to horizontal, mobile device 180 is stably held in position with respect to top 120 by retaining mechanisms 130 and 140.

Also indicated in FIG. 1E is the distance, 1', between the center of mass of the combination of system 100 and mobile device 180 and axis 112. Because of the addition of mobile device 180 and the configuration of mobile device 180, 1'<1. Stated differently, the center of mass of the combination of system 100 and mobile device 180 is closer to axis 112 than the center of mass of system 100. However, 1' is still nonzero. Thus, the center of mass of the combination of system 100 and mobile device 180 is still located some distance from axis 112. In some embodiments, 1' is at least five percent of L. In some embodiments, 1' is at least ten percent of L. In some embodiments, 1' is at least fifteen percent of L. In some embodiments, 1' is at least twenty percent of L. Thus, although display 184 is perpendicular to gravity, because 1' is nonzero, the combination of system 100 and mobile device 180 is stable with respect to rotations around axis 112 as long as base 110 is supported (e.g. by the ground, or a portion of the body of the user). Thus, even for the maximum torque exerted by display 184, the combination of system 100 and mobile device 180 is stable at the first angle, $\theta$ for the base being supported substantially perpendicular to gravity. In some embodiments, the combination of system 100 and mobile device 180 is stable in this configuration for base 110 being supported at a small angle (e.g. not more than thirty degrees, not more than twenty degrees, or not more than ten degrees) from the y-direction. In some embodiments, this is true for system 100 having a weight that is not more than the weight of mobile device 180 and/or display 184 having a weight that is less than one-fourth of the weight of base 182. In some embodiments, the combination is stable in this configuration for system 100 having a weight not more than half of mobile device 180 and/or display 184 having a weight that is less than one-fourth of the weight of base 182.

FIGS. 1F and 1G are analogous to FIGS. 1D and 1E. Thus, system 100 and the combination of system 100 and mobile device 180 are shown in FIGS. 1F and 1G, respectively. However, top 120 is locked at second angle, $\theta 1$, from base 110. The second angle is greater than the first angle ($\theta 1 > \theta$). In some embodiments, top 120 may be locked at one or more angles with respect to base 110. In some embodiments, the maximum angle between base 110 and top 120 is at least forty-five degrees and not more than one hundred degrees. In some embodiments, the maximum angle is acute (e.g. less than ninety degrees). In some embodiments, the maximum angle is at least sixty degrees. In some embodiments, the maximum angle is at least seventy degrees. In some embodiments, the maximum angle is at least eighty degrees. In some embodiments, the maximum angle is nominally eighty-five degrees (e.g. at least eighty-three and not more than eighty-eight degrees). In some embodiments, the maximum angle is not more than ninety or ninety-five degrees. For the purposes of explanation, the second angle, $\theta 1$, is assumed to be the maximum angle for system 100. Although depicted as an acute angle, as discussed above, $\theta 1$ may be larger than shown. Further, although two angles, $\theta$ and $\theta 1$, are depicted in FIGS. 1D-1H, in some embodiments, system 100 may be locked at other and/or additional angles. Although $\theta 1$ is greater than $\theta$, retaining mechanisms 130 and 140 still hold mobile device 180 in position with respect to top 120. Stated differently, mobile device 180 does not fall out of system 100 at angles including $\theta 1$. Moreover, although $\theta$ and $\theta 1$ are indicated as the two angles at which system 100 is lockable, other and/or additional angle settings may be present. For example, the minimum angle at which top 120 and base 110 are not collapsed but are still locked in position for use may be as low as ten degrees, twenty degrees, thirty degrees or forty degrees in various embodiments.

Because $\theta 1$ is greater than $\theta$, the center of mass of system 100 has moved closer to axis 112. Thus, as shown in FIG. 1F, the center of mass of system 100 is a distance 11 from axis 112 for the second/maximum angle $\theta 1$. As shown in FIG. 1G, in the presence of mobile device 180 with display 184 perpendicular to gravity, the center of mass of the combination of system 100 and mobile device 180 has moved to a nonzero distance 11' from axis 112. As indicated in FIGS. 1F and 1G.

Because display 184 is oriented perpendicular to the local direction of gravity (i.e. perpendicular to the z-axis), display 184 has a maximum torque for a rotation counter-around axis 112. However, the center of mass of the combination of system 100 and mobile device 180 is still located a nonzero distance from axis 112. In some embodiments, 11' is at least five percent of L. In some embodiments, 11' is at least ten percent of L. In some embodiments, is 11' is at least fifteen percent of L. In some embodiments, 11' is at least twenty percent of L. Thus, although display 184 is perpendicular to gravity, because 11' is nonzero, the combination of system 100 and mobile device 180 is stable with respect to rotations around axis 112 as long as base 110 is supported (e.g. by the ground or a portion of the body of the user). Thus, even for the maximum torque for rotations around axis 112 in the clockwise direction/away from base 110 exerted by display 184, the combination of system 100 and mobile device 180 is stable at the second, maximum angle, $\theta 1$ for base 110 being supported substantially perpendicular to gravity. In some embodiments, the combination of system 100 and mobile device 180 is stable in this configuration for base 110 being supported at a small angle (e.g. not more than thirty degrees, not more than twenty degrees, or not more than ten degrees) from the y-direction. In some embodiments, this is true for system 100 having a weight that is not more than the weight of mobile device 180 and/or display 184 having a weight that is less than one-fourth of the weight of base 182. In some embodiments, the combination is stable in this configuration for system 100 having a weight not more than half of mobile device 180 and/or display 184 having a weight that is less than one-fourth of the weight of base 182.

FIG. 1H depicts system 100 and mobile device 180 in which base 110 and top 120 are still open at second angle θ1. However, display 184 has been rotated so that its center of mass is closer to axis 112 than in FIG. 1G. As a result, the center of mass of the combination of system 100 and mobile device 180 has moved further from axis 112 than is shown in FIG. 1G, to a distance of 11". In this configuration, the combination of system 100 and mobile device is more stable with respect to rotations around axis 112 than in the configuration shown in FIG. 1G.

System 100 can thus support mobile device 180 at large angles with respect to perpendicular to the local direction of gravity (i.e. horizontal in FIGS. 1A-1H) such that mobile device 180 is stable. As a result, mobile device 180 may be used in a variety of locations. For example, when supported by system 100, mobile device 180 may be used while a user is prone (e.g. supported by the user's body) and remain stable even at high angles and extreme positions of display 184. System 100 is also collapsible and, in some embodiments, may fold to be flat as shown in FIG. 1A. Further, in some embodiments, system 100 may not weigh more than mobile device 180. Thus, system 100 may be readily transportable.

Figure 2A:
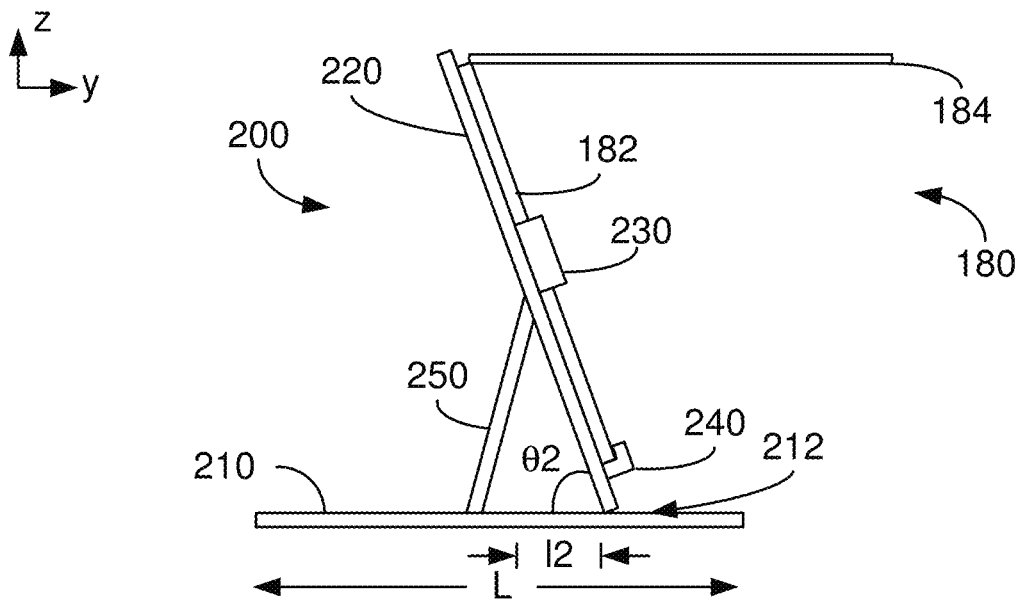
FIGS. 2A-2B depict side views of embodiments of systems for supporting a mobile device.
Figure 2B:
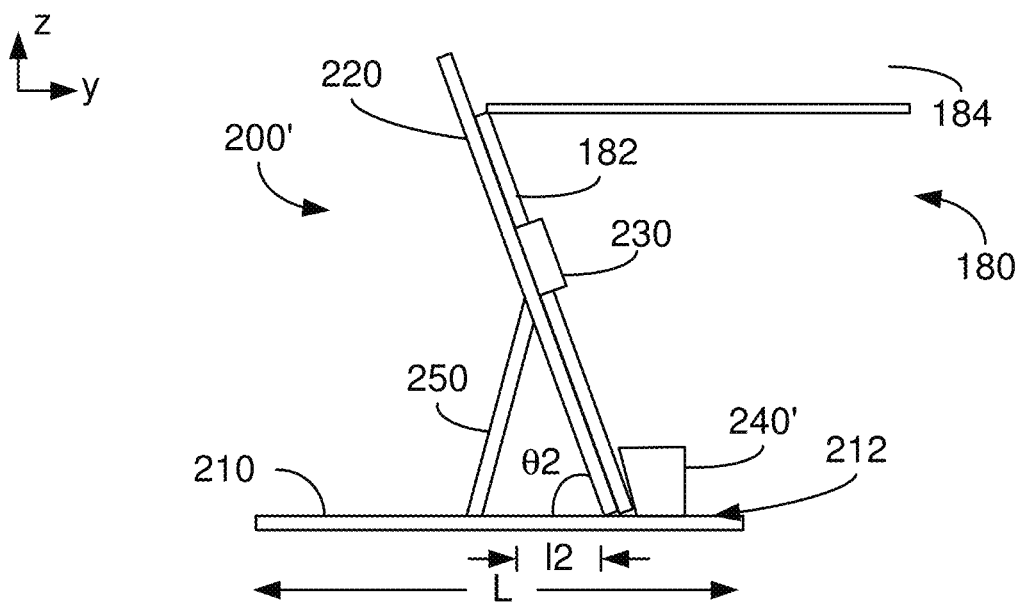

FIGS. 2A-2B depict side views of embodiments of systems 200 and 200' for supporting a mobile device. Systems 200 and 200' are shown in conjunction with mobile device 180. Systems 200 and 200' are analogous to system 100. Consequently, analogous components have similar labels. Thus, system 200 includes base 210, axis 212, top 220, retaining mechanisms 230 and 240, and support structure(s) 250 that are analogous to base 110, axis 112, top 120, retaining mechanisms 130 and 140 and support structures 150, respectively. Similarly, system 200' includes base 210, axis 212, top 220, retaining mechanisms 230 and 240', and support structure(s) 250 that are analogous to base 110, axis 112, top 120, retaining mechanisms 130 and 140 and support structures 150, respectively.

In systems 200 and 200', top 220 is coupled to base 210. However, systems 200 and 200' do not have a clamshell configuration. Top 220 is lockable with respect to base 210 at one or more angle(s), θ2. In some embodiments, θ2 is analogous to θ and θ1 and thus may have similar magnitude(s). However, axis 212 is not at the edge of base 210. Instead, top 220 both rotates and shift position with respect to base 210 such that top 220 locks with its edge some distance from the edge of base 210. In some embodiments, stops (not shown in FIG. 2A) or other structures fix the edge of top 220 with respect to base 210. For example a stop on base 210 or a depression in base 210 may be used to lock top 220 in place in system 200. In system 200', retaining mechanism 240' also functions as such a stop. Retaining mechanism 240' aids in holding both mobile device 180 and top 220 in place. Thus, such structures determine the position of axis 212 with respect to the edge of base 210. In the embodiment shown, center of mass of the combination of system 200/200' and mobile device 180 is a nonzero distance, 12, from axis 212. In some embodiments, 12 is a fraction of L that is analogous to the fraction of 1, 1', 11, 11', 11" with respect to L. Because axis 212 is not at the edge of base 210, systems 200 and 200' may be more stable. For example, θ2 may be up to one hundred and ten degrees in some embodiments.

Systems 200 and 200' operate in an analogous manner to system 100. Thus, the combination of system 200/200' and mobile device 180 is stable with respect to rotations around axis 212 even if display 184 has a maximum torque due to gravity (e.g. display 184 is perpendicular to gravity as shown in FIG. 2).

Systems 200 and 200' can thus support mobile device 180 at large angles with respect to perpendicular to the local direction of gravity (i.e. horizontal in FIG. 2) such that mobile device 180 is stable. As a result, mobile device 180 may be used in a variety of locations. For example, when supported by system 200/200', mobile device 180 may be used while a user is prone (e.g. supported by the user's body) and remain stable even at high angles and extreme positions of display 184. Systems 200 and 200' are also collapsible and, in some embodiments, may fold to be flat as shown in FIG. 1A. Further, in some embodiments, systems 200 and 200' may not weigh more than mobile device 180. Thus, systems 200 and 200' may be readily transportable.

Figure 3:
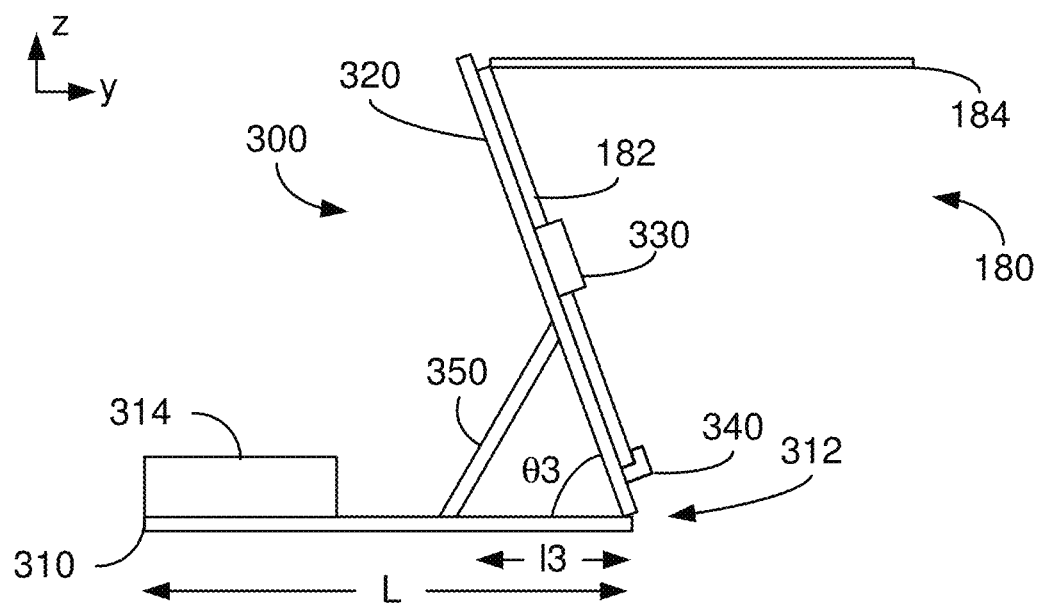
FIG. 3 depicts a side view of an embodiment of a system for supporting a mobile device.

FIG. 3 depicts a side view of an embodiment of system 300 for supporting a mobile device. System 300 is shown in conjunction with mobile device 180. System 300 is analogous to system 100. Consequently, analogous components have similar labels. Thus, system 300 includes base 310, axis 312, top 320, retaining mechanisms 330 and 340, and support structure(s) 350 that are analogous to base 110, axis 112, top 120, retaining mechanisms 130 and 140 and support structures 150, respectively. System 300 also operates in a manner analogous to system 100.

System 300 also includes counterbalance 314 coupled to base 310. In some embodiments counterbalance 314 might be coupled to top 320. In some embodiments, multiple counterbalance structures can be used and coupled to base 310 and/or top 320. Counterbalance 314 provides additional weight to offset the torque induced by mobile device 180. For example, counterbalance 314 may fully or partially offset the torque from display 184, thereby increasing stability. In some embodiments, counterbalance 314 is on the opposite side of the center of mass of the combination of system 300 and mobile device 180 from at least part of display 184. Although shown as a separate structure, counterbalance 314 may be integrated into base 310 and/or top 320. For example, the base 310 and/or top 320 may have a varying density or may include insets in which higher density weights may be affixed.

Top 320 is coupled to base 310. Although system 300 has a clamshell configuration, in other embodiments another configuration (e.g. including but not limited to the configuration of system 200/200') may be used. Top 320 is lockable with respect to base 310 at one or more angle(s), θ3. In some embodiments, θ3 is analogous to θ, θ1 and/or θ2 and thus may have similar magnitude(s). In the embodiment shown, center of mass of the combination of system 300 and mobile device 180 is a nonzero distance, 13, from axis 312. In some embodiments, 13 is a fraction of L that is analogous to the fraction of 1, 1', 11, 11', 11" and/or 12 with respect to L.

System 300 operates in an analogous manner to system 100. Thus, the combination of system 300 and mobile device 180 is stable with respect to rotations around axis 312 even if display 184 has a maximum torque due to gravity (e.g. display 184 is perpendicular to gravity as shown in FIG. 2).

System 300 can thus support mobile device 180 at large angles with respect to perpendicular to the local direction of gravity (i.e. horizontal in FIG. 3) such that mobile device 180 is stable. As a result, mobile device 180 may be used in a variety of locations. For example, when supported by system 300, mobile device 180 may be used while a user is prone (e.g. supported by the user's body) and remain stable even at high angles and extreme positions of display 184. System 300 is also collapsible and, in some embodiments, may fold to be flat as shown in FIG. 1A. Further, in some embodiments, system 300 may not weigh more than mobile device 180. Thus, system 300 may be readily transportable.

Figure 4:
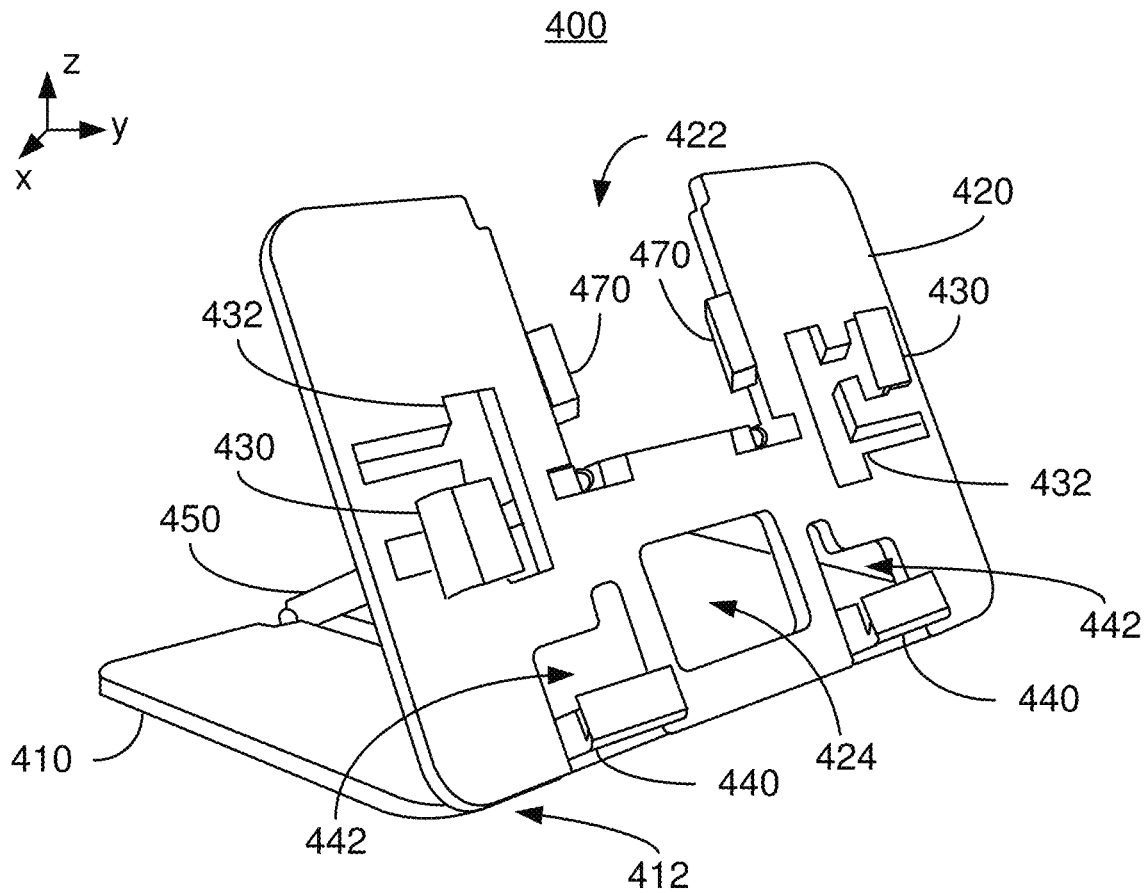
FIG. 4 depicts a perspective view of an embodiment of a system for supporting a mobile device.

FIG. 4 depicts a perspective view of an embodiment of system 400 for supporting a mobile device. System 400 is analogous to system 100. Consequently, analogous components have similar labels. Thus, system 400 includes base 410, axis 412, top 420, retaining mechanisms 430 and 440, and support structure(s) 450 that are analogous to base 110, axis 112, top 120, retaining mechanisms 130 and 140 and support structures 150, respectively. System 400 also operates in a manner analogous to system 100.

System 400 also includes slots 432 and 442 for retaining mechanisms 430 and 440, respectively. In some embodiments, retaining mechanisms 430 and 440 are clips. Slots 432 provide for ease of access to and multiple locations (two horizontal portions of slots 432 in the embodiment shown) for clips 430. Slots 442 provide for ease of access to clips 440 by the user. Top 420 also includes aperture 424 and depression 422. Aperture 424 may reduce the weight of system 400. Depression 422 not only reduces the weight of system 400 but also provides space for support structures 450 when system is collapsed.

Also shown in FIG. 4 are additional support structures 470. Additional support structures 470 may be used to retain a smaller mobile device in or near depression 422. In some embodiments, additional support structures 470 include clips. In some embodiments, additional support structures 470 includes slots or another mechanism for holding a smaller mobile device stable with respect to top 420. For example, additional support structures 470 may retain a smartphone. In some embodiments, additional support structures 470 may hold a smart phone such that the smartphone screen is viewable from the front of top 420 (e.g. viewable from the direction shown in FIG. 4) and/or such that the smartphone screen is viewable from the rear of top 420 (e.g. viewable from the opposite direction as shown in FIG. 4).

System 400 operates in an analogous manner to system 100. Thus, the combination of system 400 and a mobile device (e.g. mobile device 180) is stable with respect to rotations around axis 412 even if the display of the mobile device has a maximum torque due to gravity (e.g. the display is perpendicular to gravity). As a result, system 400 may allow use of a mobile device in a variety of locations. For example, when supported by system 400, a mobile device may be used while a user is prone (e.g. supported by the user's body) and remain stable even at high angles and extreme positions of display 184. System 400 may also support a smaller mobile device, for example for viewing while a user is prone. Thus, system 400 may be considered to extend the number and types of devices with which system 400 is compatible. System 400 is also collapsible and, in some embodiments, may fold to be flat as shown in FIG. 1A. Further, in some embodiments, system 400 may not weigh more than mobile device 180. Thus, system 400 may be readily transportable.

FIGS. 5-14 depict various views of an embodiment of system 500 for supporting a mobile device. System 500 is shown in conjunction with mobile device 180. System 500 is analogous to system 100. Consequently, analogous components have similar labels. Thus, system 500 includes base 510, axis 512, top 520, retaining mechanisms 530 and 540, and support structure(s) 550 that are analogous to base 110, axis 112, top 120, retaining mechanisms 130 and 140 and support structures 150, respectively. System 500 also includes slots 532 and 542 and depression 522 analogous to slots 432 and 442 as well as depression 422, respectively. System 500 also includes slots 516 and 526, apertures 514, 528, and 529. For simplicity, only some slots and apertures are labeled. Such openings 514, 516, 526, 528 and 529 may be used to reduce the weight of system 500, configure the position of the center of mass of system 500 (and thus the center of mass of the combination of system 500 and mobile device 180), to provide locations) for additional and/or other retaining mechanisms (not shown), for decorative purposes, and/or for other uses.

Figure 12:
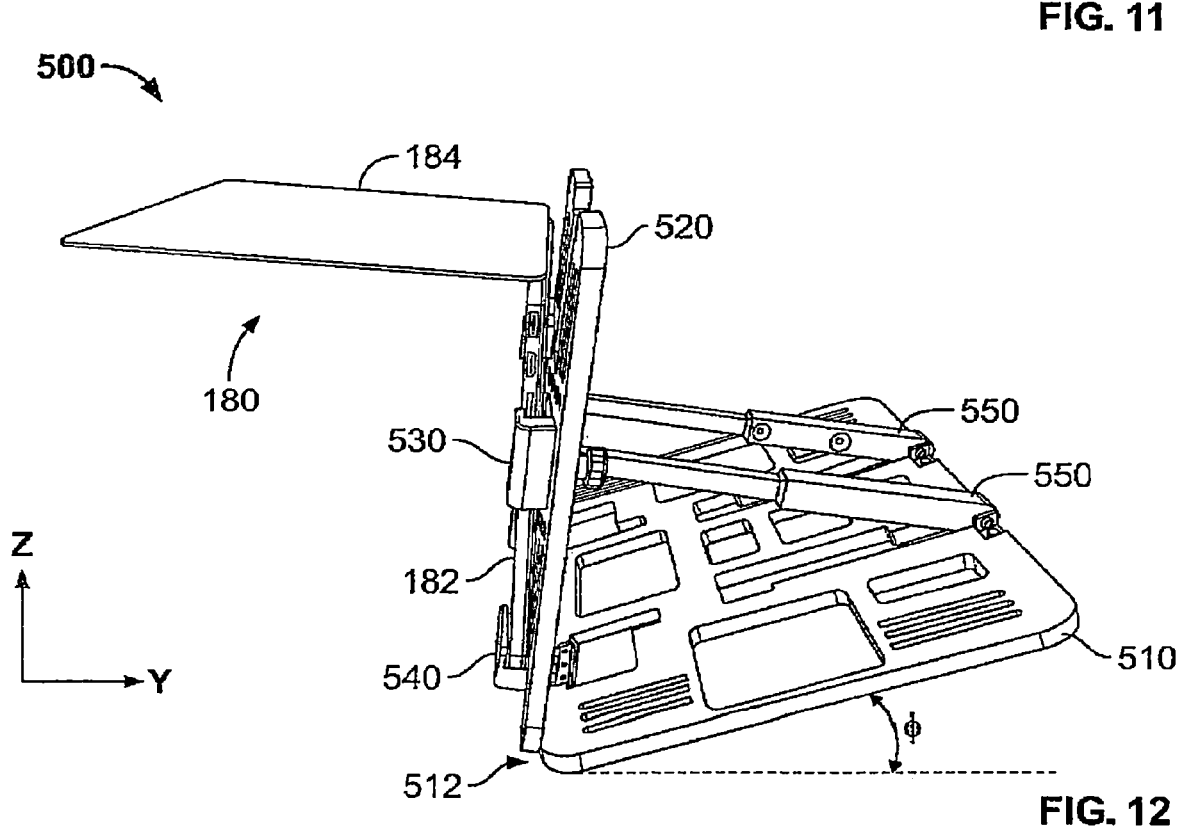

System 500 also operates in a manner analogous to system 100. Thus, the angles between base 510 and top 520 for which system 500 and mobile device 180 are stable are analogous to those described herein. Similarly, the distance between the center of mass of system 500 and the center of mass of the combination of system 500 and mobile device 180 from axis 512 are analogous to those described herein. Further, as indicated in FIG. 12, system 500 and mobile device 180 are stable even for system 500 being tilted at an angle, φ, from the direction perpendicular to the local direction of gravity. As discussed herein, φ may be not more than ten degrees, not more than twenty degrees, or not more than thirty degrees in various embodiments. Stated differently, the combination of system 500 and mobile device 180 may be stable for tilts of not less than sixty degrees, not less than seventy degrees and not less than eighty degrees from the local direction of gravity (i.e. ninety degrees−φ).

Figure 13:
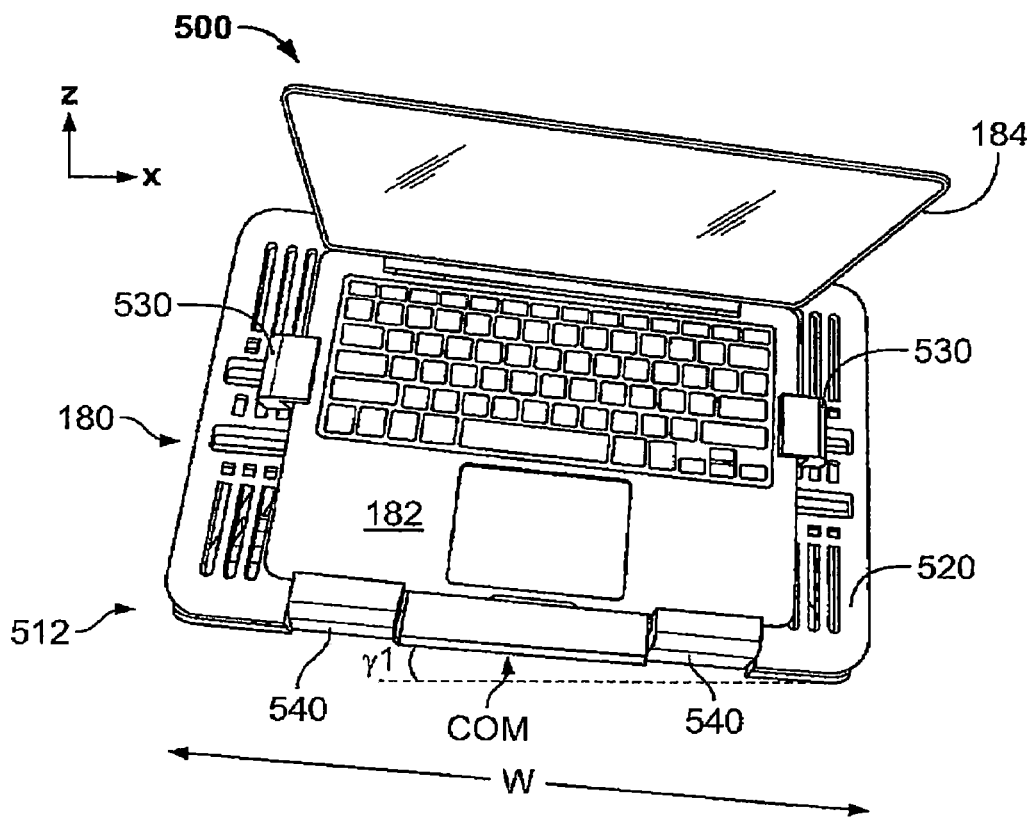
Figure 14:
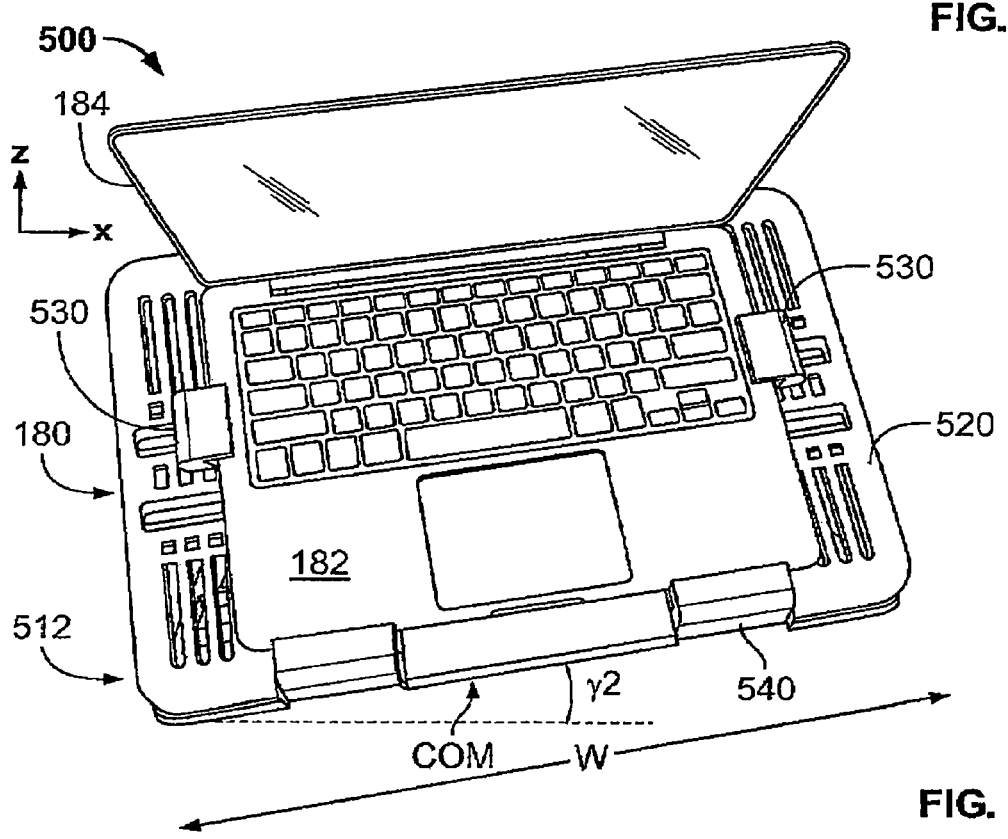

Moreover, as indicated in FIGS. 13 and 14, system 500 and mobile device 180 are stable with respect to rotations around an axis perpendicular to axis 512 for base 520 being supported at tilt angles of up to γ1 and/or γ2 around an axis perpendicular to axis 512. In some embodiments, γ1 and γ2 are in the same range as φ. In some embodiments, γ1 and γ2 are the same. In other embodiments, γ1 and γ2 may differ. Also shown in FIGS. 13 and 14 is the center of mass (COM) in the x direction. In the embodiments shown, the center of mass is at or near the center of system 500 in the x direction. However, other locations are possible.

Figure 5:
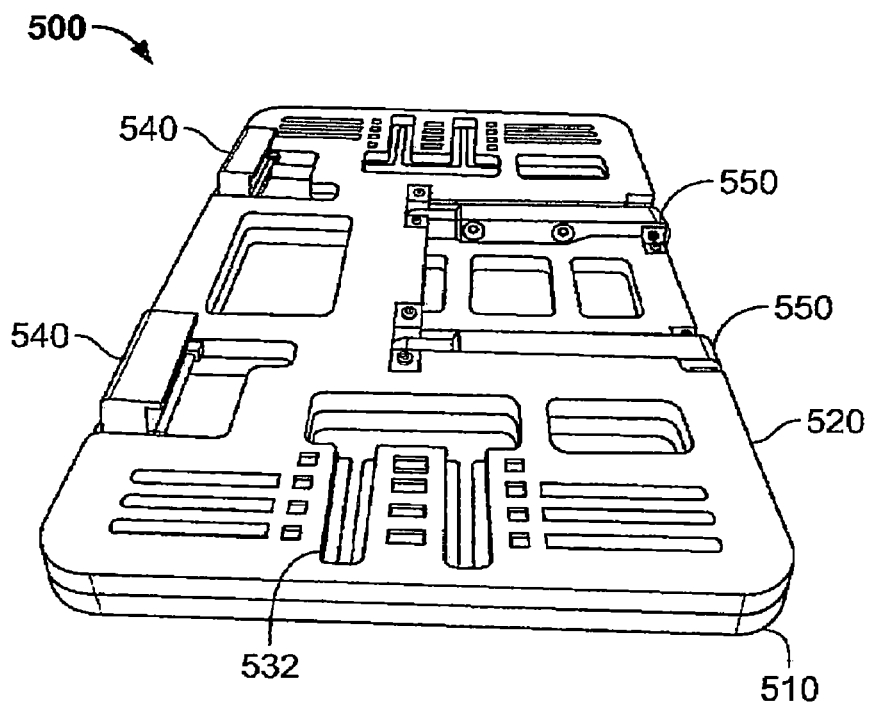
FIGS. 5-14 depict various view of an embodiment of a system for supporting a mobile device.
Figure 6:
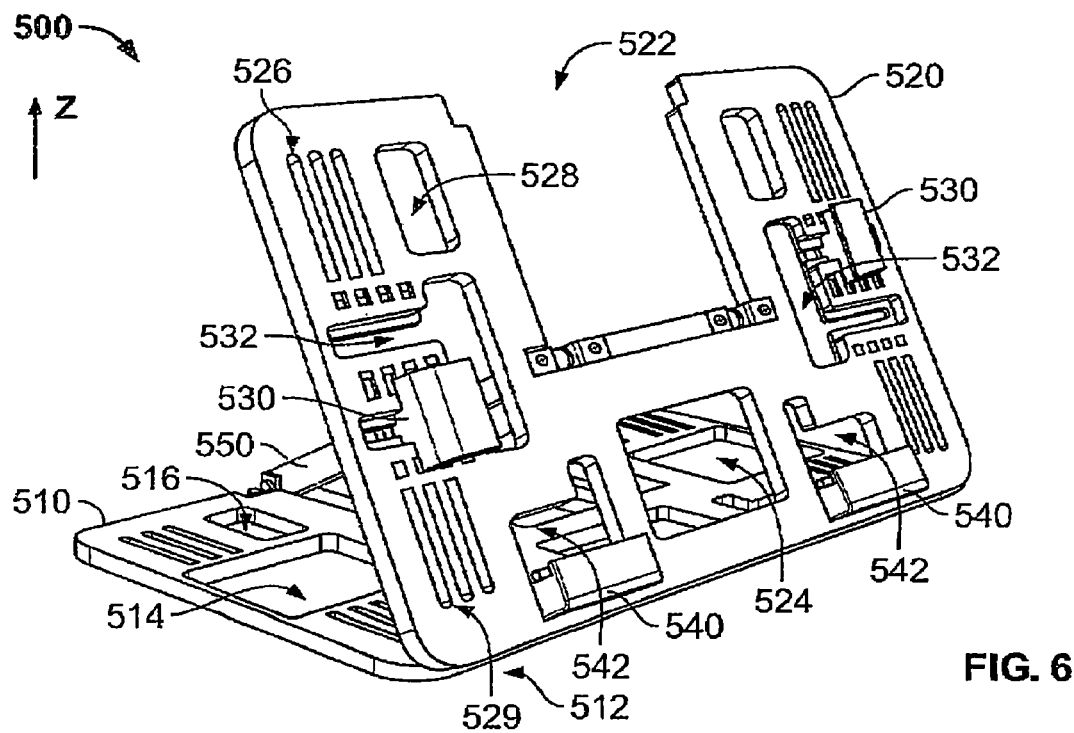
Figure 7:
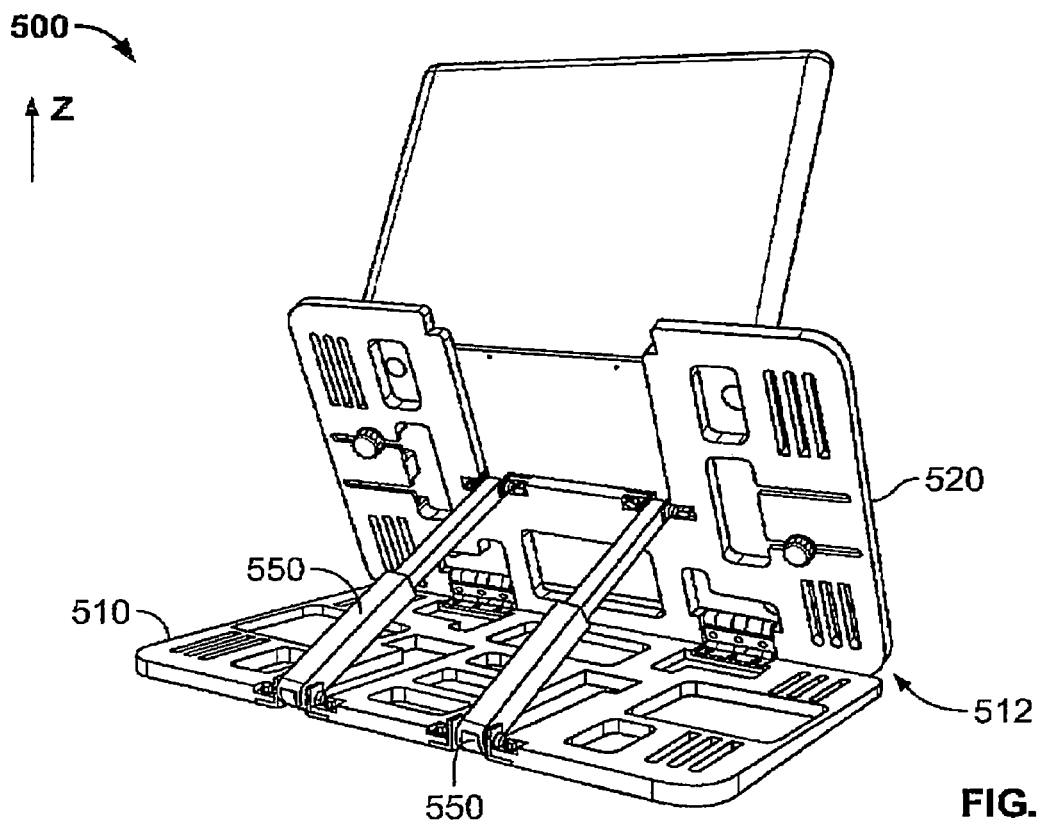
Figure 8:
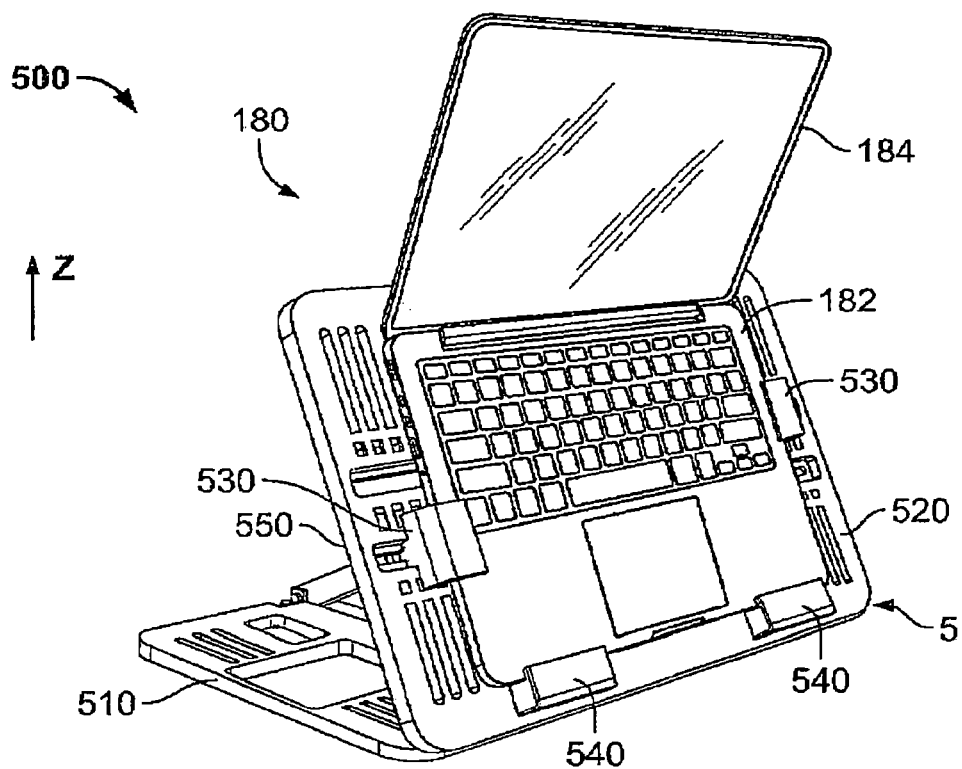
Figure 9:
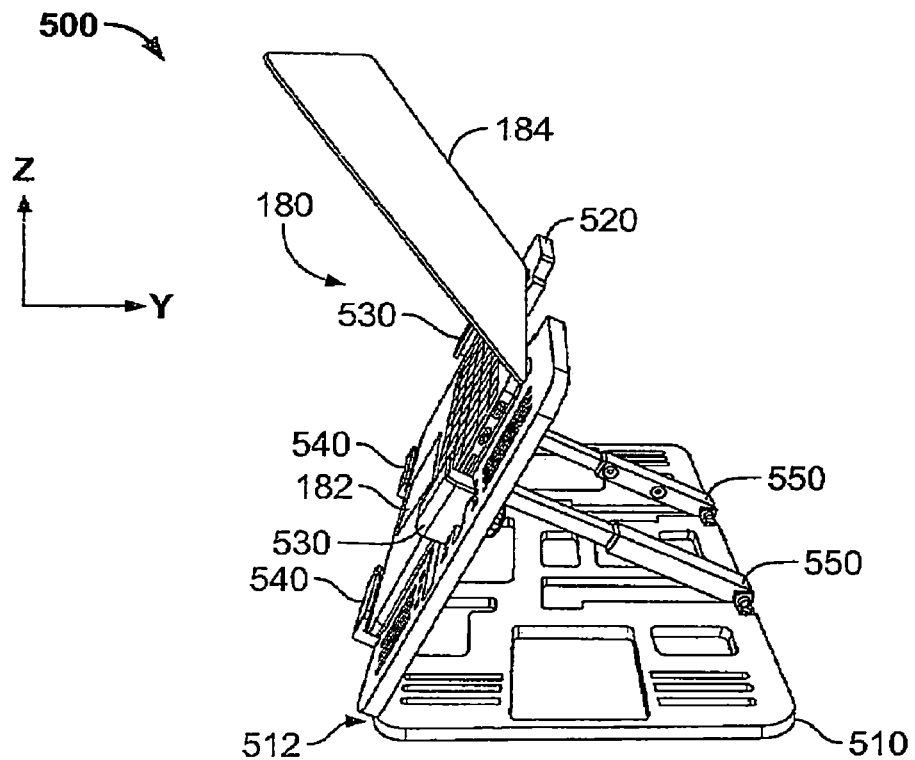
Figure 10:
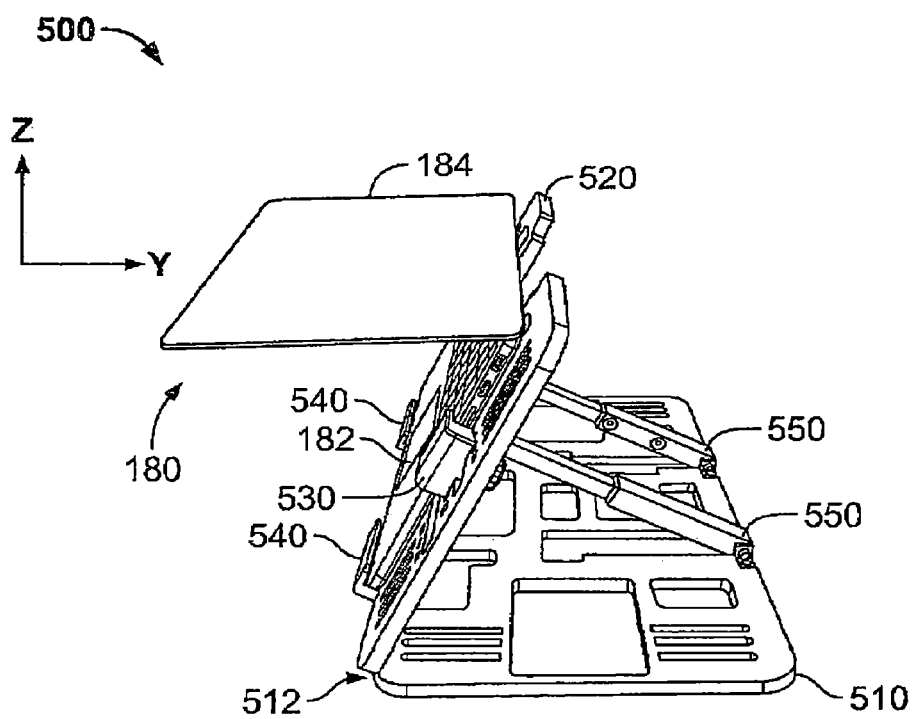
Figure 11:
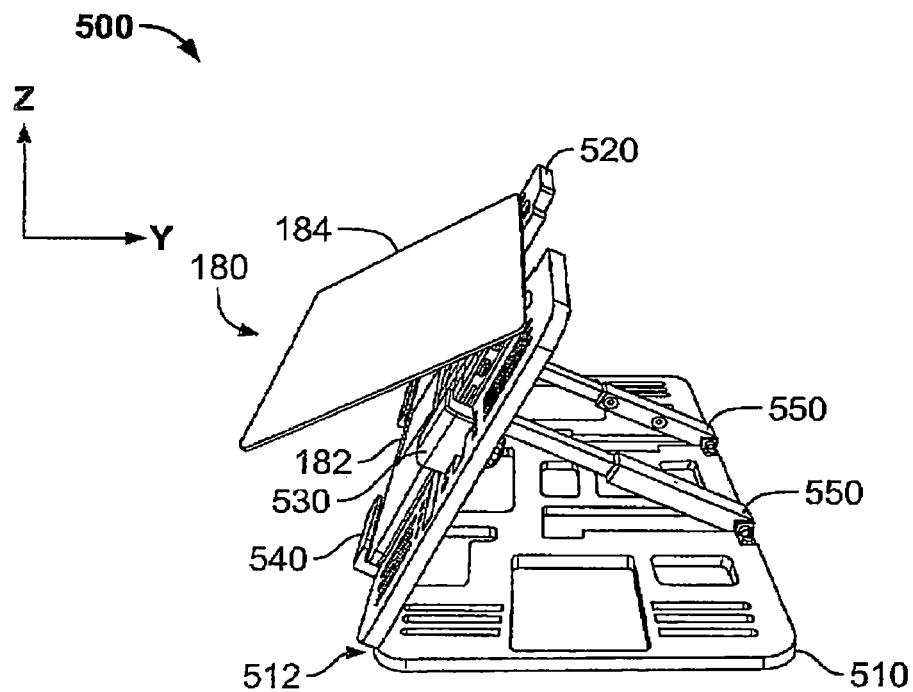

System 500 can thus support mobile device 180 at large angles with respect to perpendicular to the local direction of gravity such that mobile device 180 is stable. As a result, mobile device 180 may be used in a variety of locations. For example, when supported by system 500, mobile device 180 may be used while a user is prone (e.g. supported by the user's body) and remain stable even at high angles and extreme positions of display 184. System 500 is also collapsible and, in some embodiments, may fold to be flat as shown in FIG. 5. Further, in some embodiments, system 300 may not weigh more than mobile device 180. Thus, system 500 may be readily transportable.

Figure 15:
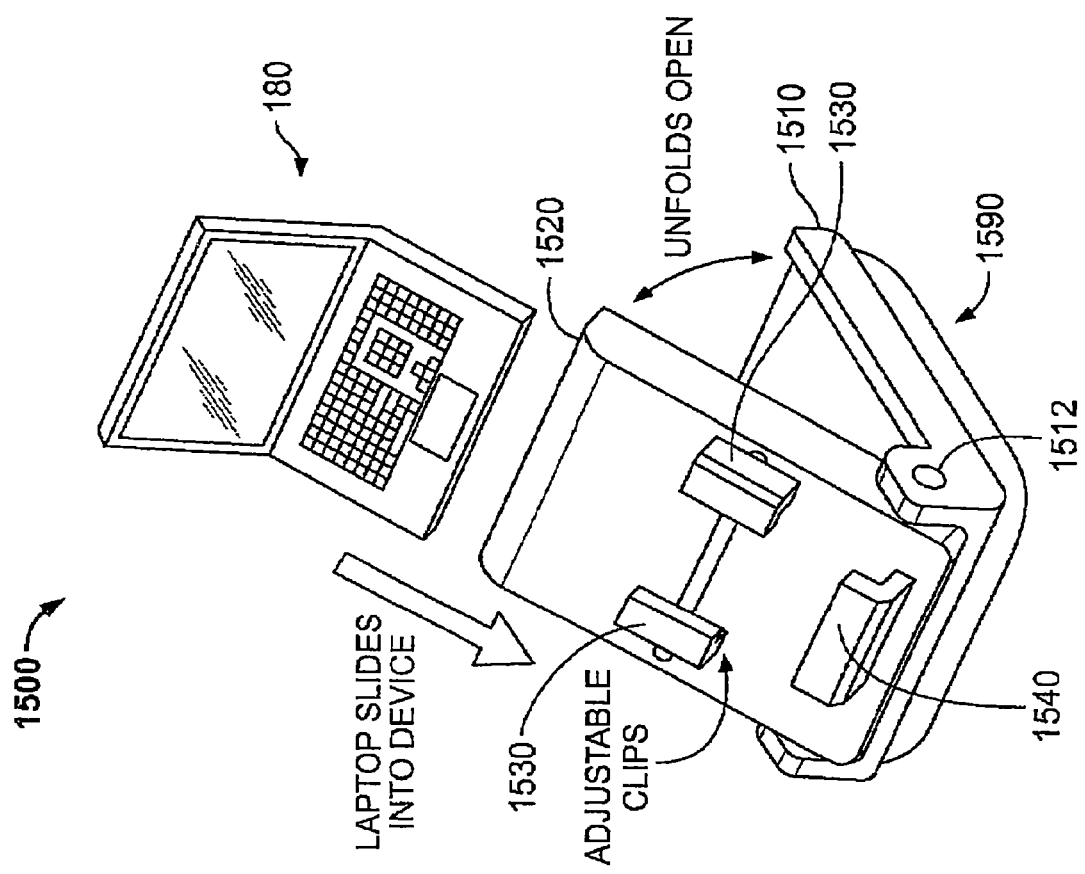
FIG. 15 depicts an embodiment of a system for supporting a mobile device.

FIG. 15 depicts a perspective view of an embodiment of system 1500 for supporting a mobile device. System 1500 is shown in conjunction with mobile device 180. System 1500 is analogous to system 100. Consequently, analogous components have similar labels. Thus, system 1500 includes base 1510, axis 1512, top 1520, and retaining mechanisms 1530 and 1540 that are analogous to base 110, axis 112, top 120, retaining mechanisms 130 and 140, respectively. System 1500 also includes cushion 1590 for improved comfort when employed by a user.

System 1500 can thus support mobile device 180 at large angles with respect to perpendicular to the local direction of gravity such that mobile device 180 is stable. As a result, mobile device 180 may be used in a variety of locations. For example, when supported by system 1500, mobile device 180 may be used while a user is prone (e.g. supported by the user's body) and remain stable even at high angles and extreme positions of display 184. System 1500 is also collapsible and, in some embodiments, may fold to be flat as shown in 5. Further, in some embodiments, system 1500 may not weigh more than mobile device 180. Thus, system 1500 may be readily transportable.

FIGS. 16-20 depict views of portions of an embodiment of system 1600 for supporting a mobile device. FIG. 16 depicts system 1600, which is analogous to system 100. Consequently, analogous components have similar labels. Thus, system 1600 includes base 1610, axis 1612, top 1620, and retaining mechanisms 1630 and 1640 that are analogous to base 110, axis 112, top 120, retaining mechanisms 130 and 140, respectively. System 1600 also includes slots 1632 that are analogous to slots 432 and 532 for adjusting the location of retaining mechanisms 1630. FIG. 17 depicts retaining mechanism 1630 as configured to fit in slot 1632. In the embodiment shown, retaining mechanism 1630 has a threaded hole therein. Also shown is screw 1636 configured to fit the threaded hole of retaining mechanism 1630 and to hold retaining mechanism 1630 in place in slot 1632. FIG. 18 depicts top 1620 and slots 1632 and 1634. Additional slots 1634 provide a mechanism for setting retaining mechanism 1630 (e.g. a clip) within slot 1632. FIG. 19 depicts an embodiment of retaining mechanism 1640, which may be a bottom clip. FIG. 20 depicts an embodiment of base 1610 and additional cushion 1690 that may be affixed to base 1610. System 1600 may provide benefits analogous to those described herein for systems 100, 200, 200', 300, 400, 500 and 1500.

FIGS. 21-23B depict views of portions of embodiments of system(s) analogous to systems 100, 200, 200', 300, 400, 500, 1500 and/or 1600 for supporting a mobile device. FIG. 21 depicts rubber grip 2100 which may be used in conjunction with retaining mechanisms such as retaining mechanisms 1630 and/or 1640. FIG. 22 depicts hinge 2200 that may be used to affix the top (e.g. top 120, 320, 420, 520, 1520 and/or 1620) to the base (e.g. base 110, 310, 410, 510, 1510 and/or 1610). FIGS. 23A and 23B depict two positions of support structures 2300 that are analogous to support structures 150, 250, 350, 450, 550, 1550 and/or 1650. Thus, systems utilizing components 2100, 2200 and/or 2300 may have improved performance.

Figure 24:
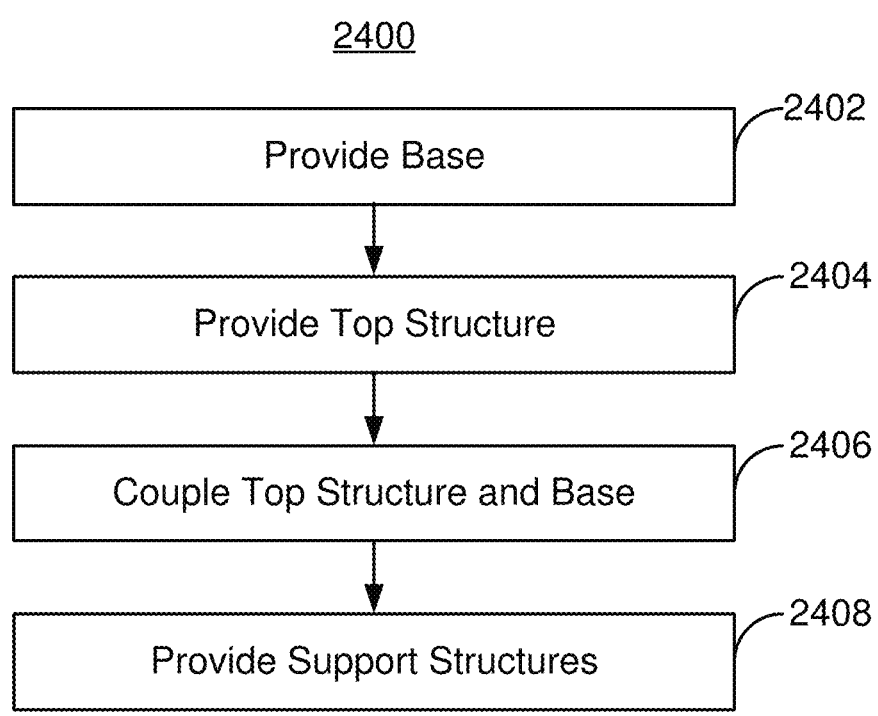
FIG. 24 is a flow chart depicting an exemplary embodiment of a method for providing a system for supporting a mobile device.

FIG. 24 is a flow chart depicting an exemplary embodiment of method 2400 for providing a system for supporting a mobile device. Method 2400 may include steps that are not depicted for simplicity. Method 2400 is described in the context of system 1500. However, method 2400 may be used with other systems including but not limited to systems 100, 200, 200', 300, 400, 500, 1500 and/or 1600.

A base is provided, at 2402. In some embodiments, 2402 may include molding a base, laser cutting a base, and/or forming components of and assembling the base. A top is provided, at 2404. In some embodiments, 2404 may include molding a top, laser cutting a top panel, and/or forming components of and assembling the top. For example, the shape, apertures, depressions and other features of the top may be cut from a larger workpiece, forming a top panel. Retaining mechanisms and other components may also be added to assemble the top. Thus, the top (otherwise termed top structure or top assembly) is formed.

The top is coupled to the base, at 2406. In some embodiments, 2406 includes affixing the top and bottom to the same hinge(s) in a clamshell configuration. In some embodiments, such as system 200 and/or 200', the top is coupled to the base in anther manner. For example, the top and base may be connected to the same support structures.

The support structures that can lock the top with respect to the base at particular angle(s) are provided, at 2408. For example, the support structures may be aligned and affixed to the appropriate portions of the top and base. Fabrication may then be completed. For example, other structures including but not limited to additional retaining mechanism(s), cushions and/or other portions of the system may be provided. Thus, using method 2400 a system, such as system 100, 200, 200', 300, 400, 500, 1500 and/or 1600 may be fabricated.

A system for stably supporting a mobile device has been described. The method and system have been described in accordance with the exemplary embodiments shown, and one of ordinary skill in the art will readily recognize that there could be variations to the embodiments, and any variations would be within the spirit and scope of the method and system. Accordingly, many modifications may be made by one of ordinary skill in the art without departing from the spirit and scope of the appended claims.

I claim:

1. A system for supporting a mobile device, comprising:
a base; and
a top collapsibly coupled to the base, the top being configured to retain the mobile device and being configured to lock at an angle with respect to the base, the angle having a vertex, the top and the base being configured such that a center of mass of a combination of the mobile device and the system is a nonzero distance along the base from the vertex of the angle and such that the combination is stable with respect to rotations around an axis including the vertex for the base being supported by a support, for the angle being at least forty-five degrees and not more than one hundred degrees, for the base being oriented perpendicular to a direction of local gravity, and for the base being free to rotate away from the support;
wherein the mobile device has a mobile device base having an edge and a mobile device display coupled to the mobile device base at the edge, wherein the mobile device base is retained by the top, and wherein the base and the top are configured to be stable with respect to the rotations around the axis for the angle being at least sixty degrees and not more than seventy degrees and the mobile device display being perpendicular to the direction of local gravity.

2. The system of claim 1, wherein the system is configured such that the combination is stable with respect to the rotations around the axis for the mobile device display having a maximum torque around the axis.

3. The system of claim 1, wherein the top is coupled to the base in a clamshell configuration.

4. The system of claim 1, wherein the base has an edge and wherein the axis is located a distance from the edge.

5. The system of claim 1, wherein the angle is at least sixty degrees.

6. The system of claim 1, wherein the angle is at least seventy degrees.

7. The system of claim 1, further comprising:
at least one support structure coupled to the top and the base, the at least one support structure having a plurality of locking positions such that the top is locked at the angle with respect to the base.

8. The system of claim 1, wherein the top further includes:
a plurality of adjustable retaining mechanisms for stabilizing the mobile device against rotations around an additional axis perpendicular to the axis.

9. The system of claim 1, wherein the top and the base are configured such that the center of mass is the nonzero distance along the base from the vertex and such that the combination is stable with respect to rotations around the axis for the base being supported and at an acute angle to the direction of local gravity, the acute angle being at least sixty degrees.

10. The system of claim 1, wherein the nonzero distance is at least ten percent of a length of the base from the vertex of the angle for the angle being at least sixty degrees and not more than seventy degrees and the mobile device display being perpendicular to the direction of local gravity.

11. A system for supporting a mobile device, comprising:
a base having a base edge; and
a top having a top edge and configured to retain the mobile device, the top being collapsibly coupled to the base in a clamshell configuration, the top being configured to retain the mobile device and to lock at an angle with respect to the base, the clamshell configuration being such that the base edge and top edge are connected by a hinge and such that the angle has a vertex at the hinge, the top and the base being configured such that a center of mass of a combination of the mobile device and the system is a nonzero distance along the base from the vertex of the angle and such that the combination is stable with respect to rotations around an axis including the vertex for the base being supported by a support, the base being oriented perpendicular to a direction of local gravity, and the angle being at least forty-five degrees and not more than one hundred and ten degrees.

12. The system of claim 11, further comprising:
at least one support structure coupled to the top and the base, the at least one support structure having a plurality of locking positions such that the top is locked at the angle with respect to the base.

13. The system of claim 11, wherein the center of mass of the combination is the nonzero distance along the base from the vertex of the angle and the combination is stable with respect to rotations around the axis for the base being free to rotate away from the support.

14. The system of claim 11, wherein the top and the base are configured such that the center of mass is the nonzero distance along the base from the vertex and such that the combination is stable with respect to rotations around the axis for the base being supported and at an acute angle to the direction of local gravity, the acute angle being at least sixty degrees.

15. A system for supporting a mobile device, comprising:
a base;
a plurality of retaining mechanisms; and
a top collapsibly coupled to the base an having a plurality of apertures therein, the top being configured to lock at an angle with respect to the base, the angle having a vertex, the top and the base being configured such that a center of mass of a combination of the mobile device and the system is a nonzero distance along the base from the vertex of the angle and such that the combination is stable with respect to rotations around an axis including the vertex for the base being supported by a support, the base being oriented perpendicular to a direction of local gravity, and the angle being at least forty-five degrees and not more than one hundred degrees;
wherein the plurality of retaining mechanisms is configured to mate with at least a portion of the plurality of apertures such that the mobile device is retained with respect to the plurality of apertures and stabilized against rotations around an additional axis perpendicular to the axis.

16. The system of claim 15, further comprising:
at least one support structure coupled to the top and the base, the at least one support structure having a plurality of locking positions such that the top is locked at the angle with respect to the base.

17. The system of claim 15, wherein the center of mass of the combination is the nonzero distance along the base from the vertex of the angle and the combination is stable with respect to rotations around the axis for the base being supported by a support, being free to rotate away from the support, and being perpendicular to a direction of local gravity.

18. The system of claim 15, wherein the top and the base are configured such that the center of mass is the nonzero distance along the base from the vertex and such that the combination is stable with respect to rotations around the axis for the base being supported and at an acute angle to the direction of local gravity, the acute angle being at least sixty degrees.

* * * * *